United States Patent [19]

Geppert

[11] 4,216,868

[45] Aug. 12, 1980

[54] OPTICAL DIGITAL SENSOR FOR CRANE OPERATING AID

[75] Inventor: Steven Geppert, Bloomfield Hills, Mich.

[73] Assignee: Eaton Corporation, Cleveland, Ohio

[21] Appl. No.: 931,221

[22] Filed: Aug. 4, 1978

[51] Int. Cl.³ .............................................. B66C 13/48
[52] U.S. Cl. .................................... 212/155; 340/685; 340/810
[58] Field of Search ................ 212/39 R, 39 A, 39 D, 212/39 MS; 340/685, 809, 810

[56] References Cited

U.S. PATENT DOCUMENTS

| 3,381,288 | 4/1968 | Van Vlodrop | 340/810 |
|---|---|---|---|
| 3,489,294 | 1/1970 | Greb et al. | 212/39 R |
| 3,710,368 | 1/1973 | Hamilton | 212/39 A X |
| 4,037,742 | 7/1977 | Gustafsson | 212/39 MS X |

*Primary Examiner*—Robert G. Sheridan
*Attorney, Agent, or Firm*—R. J. McCloskey; D. Wood; J. G. Lewis

[57] ABSTRACT

A crane operating aid comprises a load moment computer and a number of sensors which monitor crane parameters, such as boom length, boom angle, slewing angle, and boom reaction forces. The computer then calculates the percentage of load capacity as a function of the crane manufacturer's published load rating tables. Absolute encoding digital optical sensors are employed to monitor linear or angular displacement between portions of the crane which are operatively moveable with respect to one another. The digital output signals from the various sensors are then fed to the computer for use in its calculations. Each sensor comprises a detector made up of a light emitting element which is spaced from a light receiving element and an encoder disc which is mounted for displacement with respect to the detector and operates to present a series of tracks intermediate the light emitting portion and light receiving portion of the detector. Each track comprises a series of alternatingly opaque and transparent portions. By moving the encoder disc with respect to the detector, digitally encoded information is imparted to the detector representative of the displacement of the portions of the crane being monitored. An outage detector monitors the light emitting portion of the detector and generates a fault condition signal upon the failure of any of the light sources within the light emitting portion.

24 Claims, 21 Drawing Figures

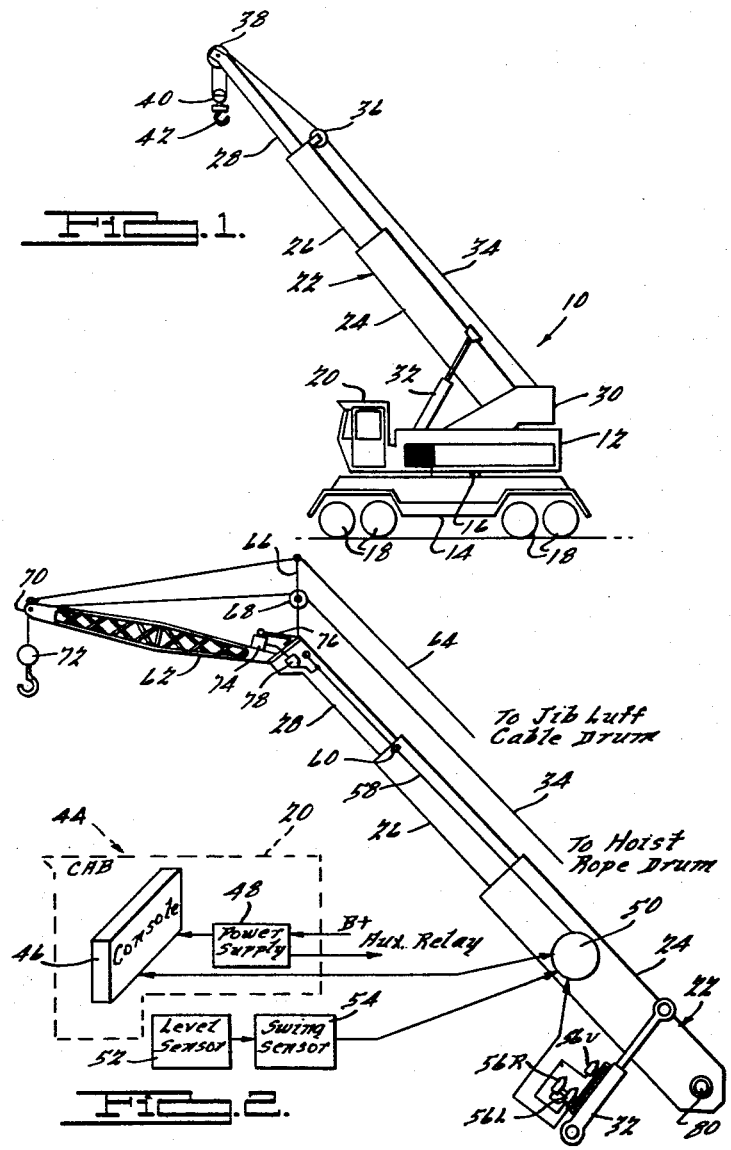

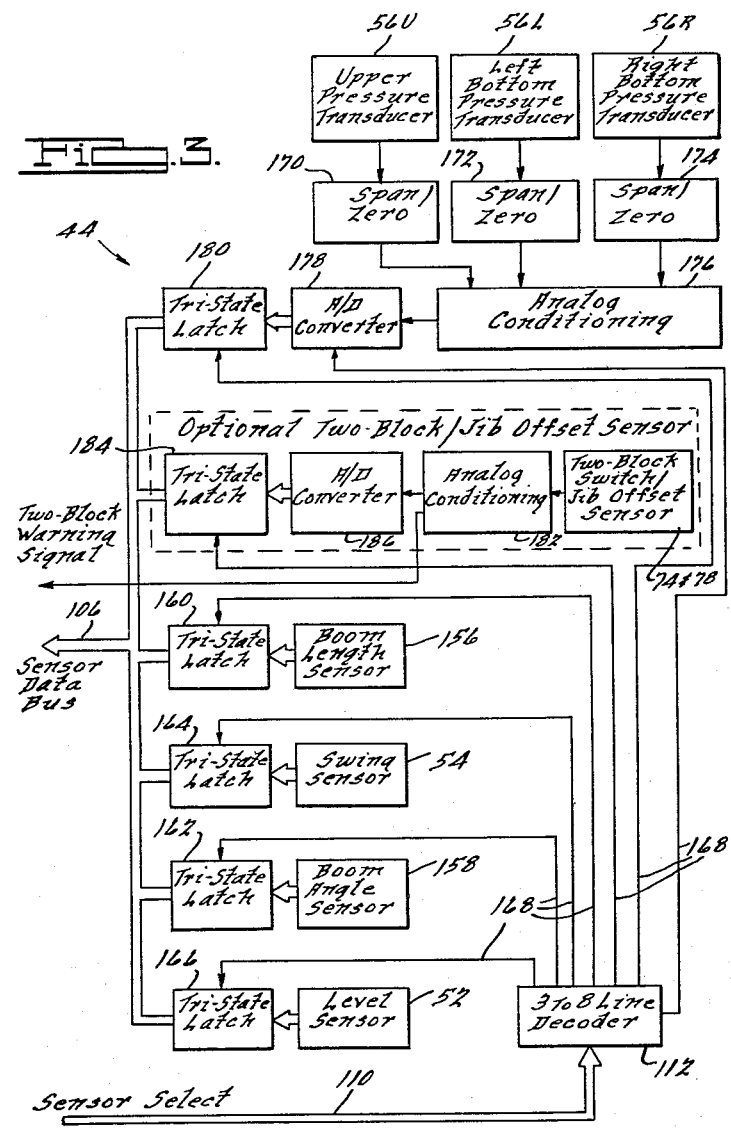

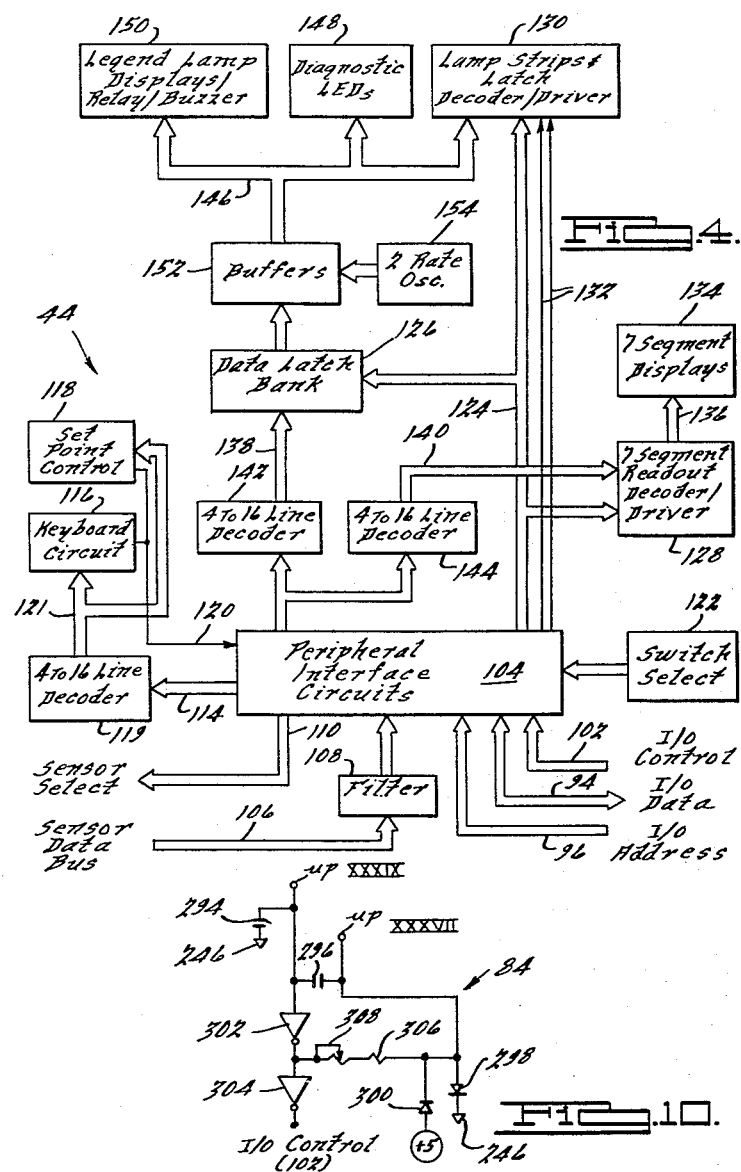

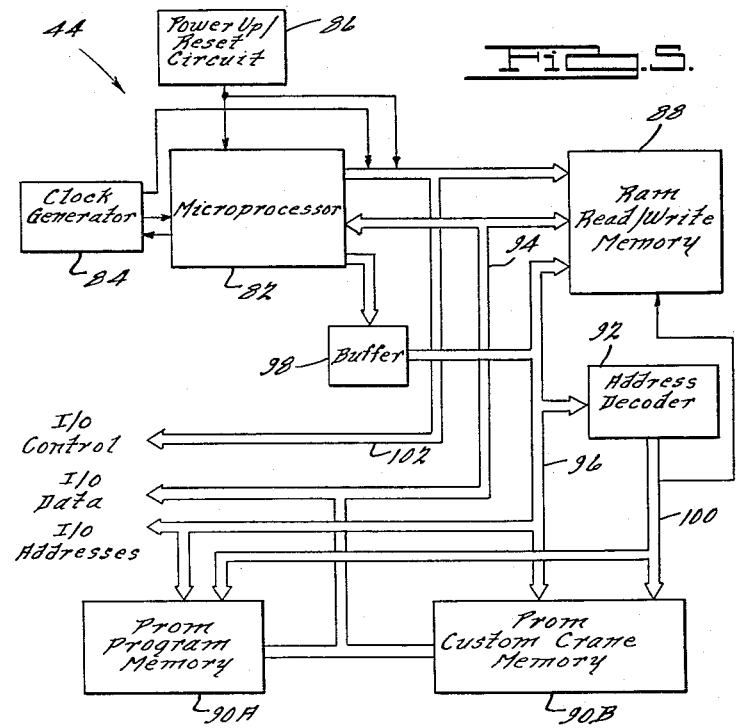
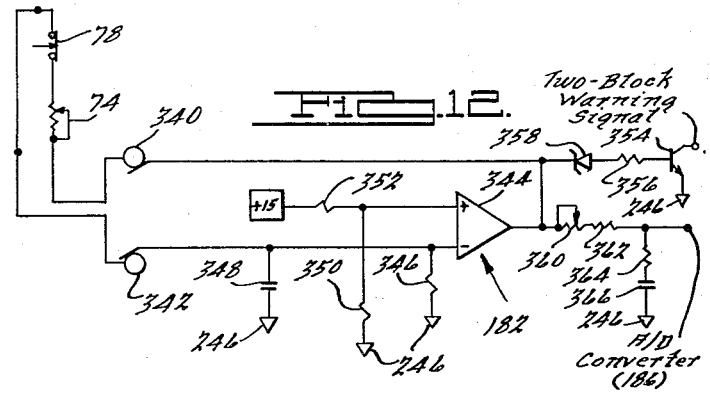

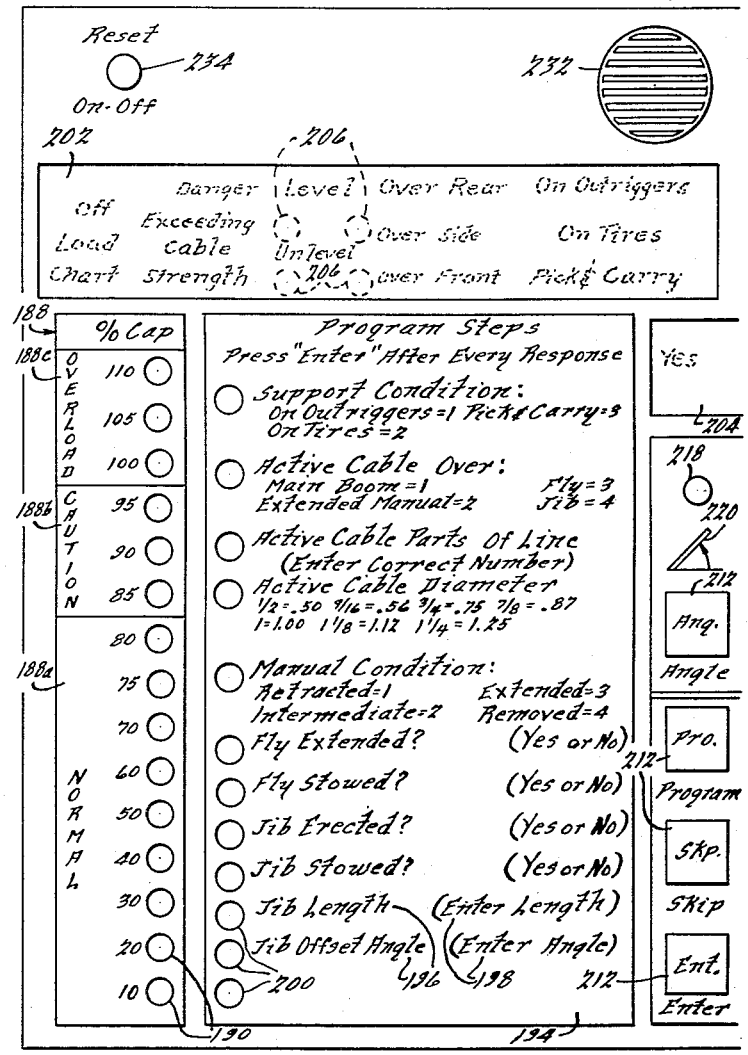

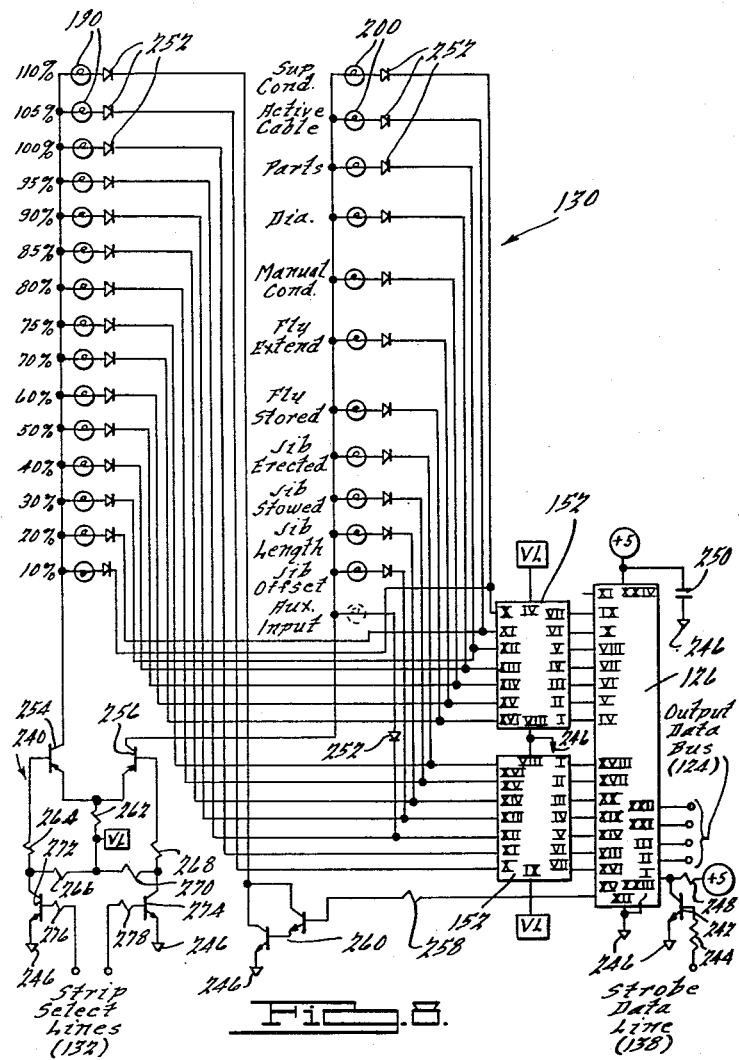

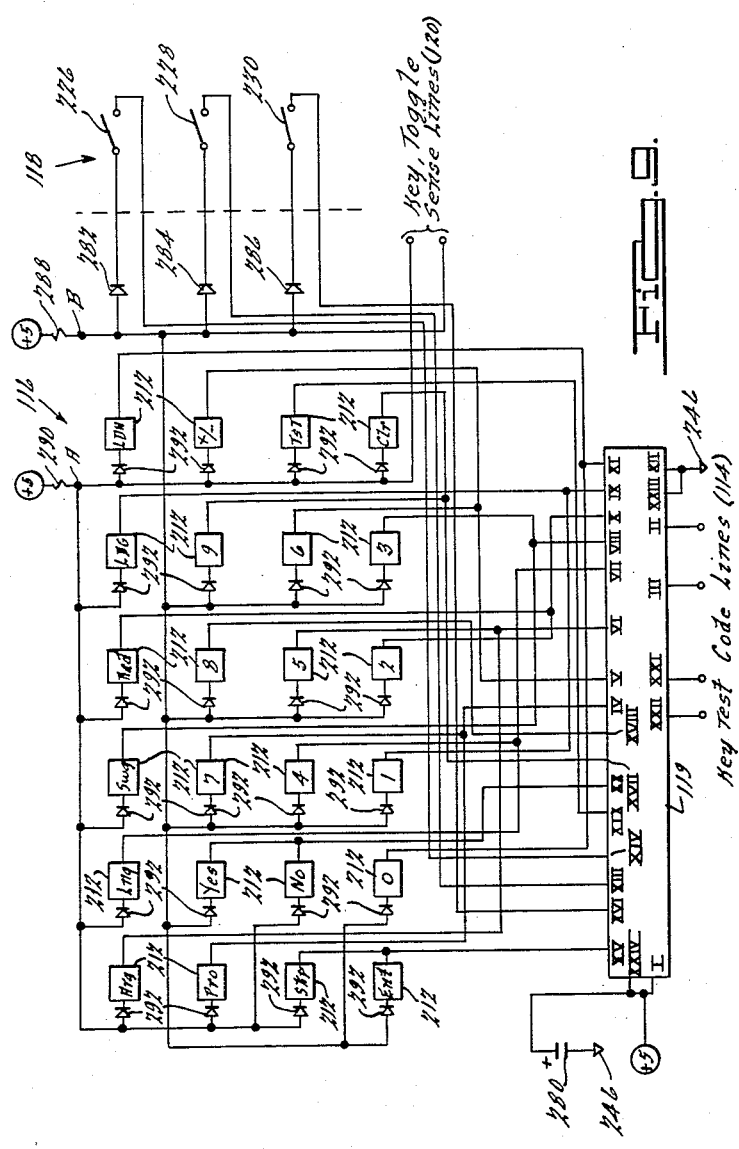

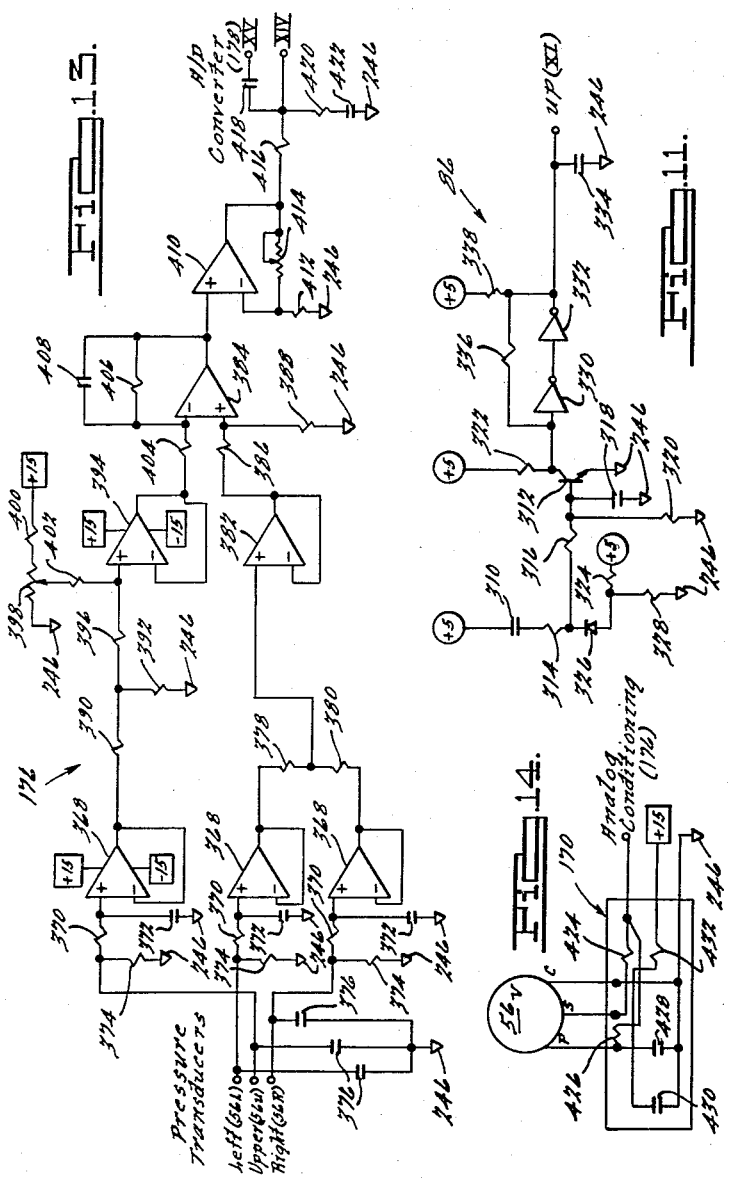

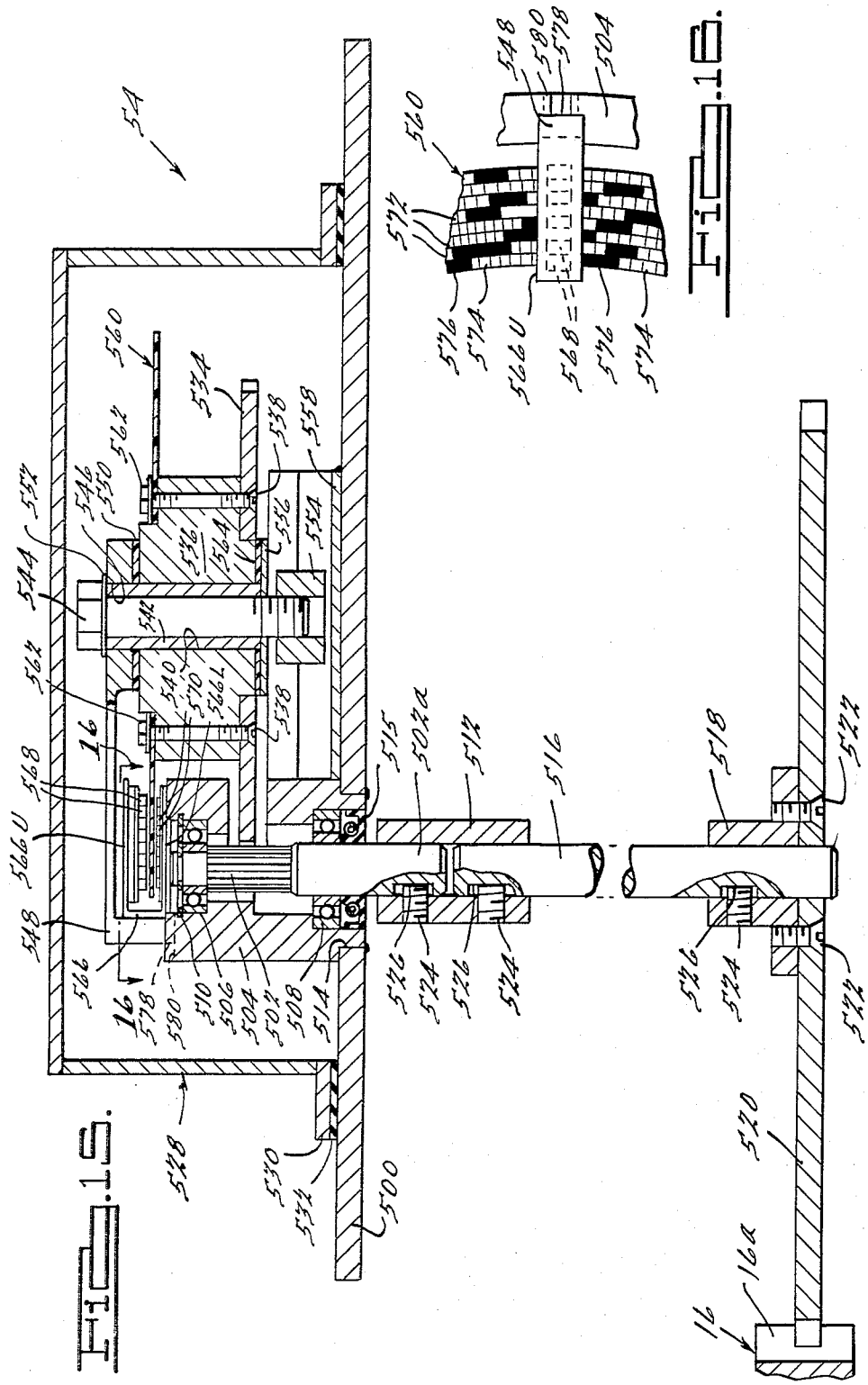

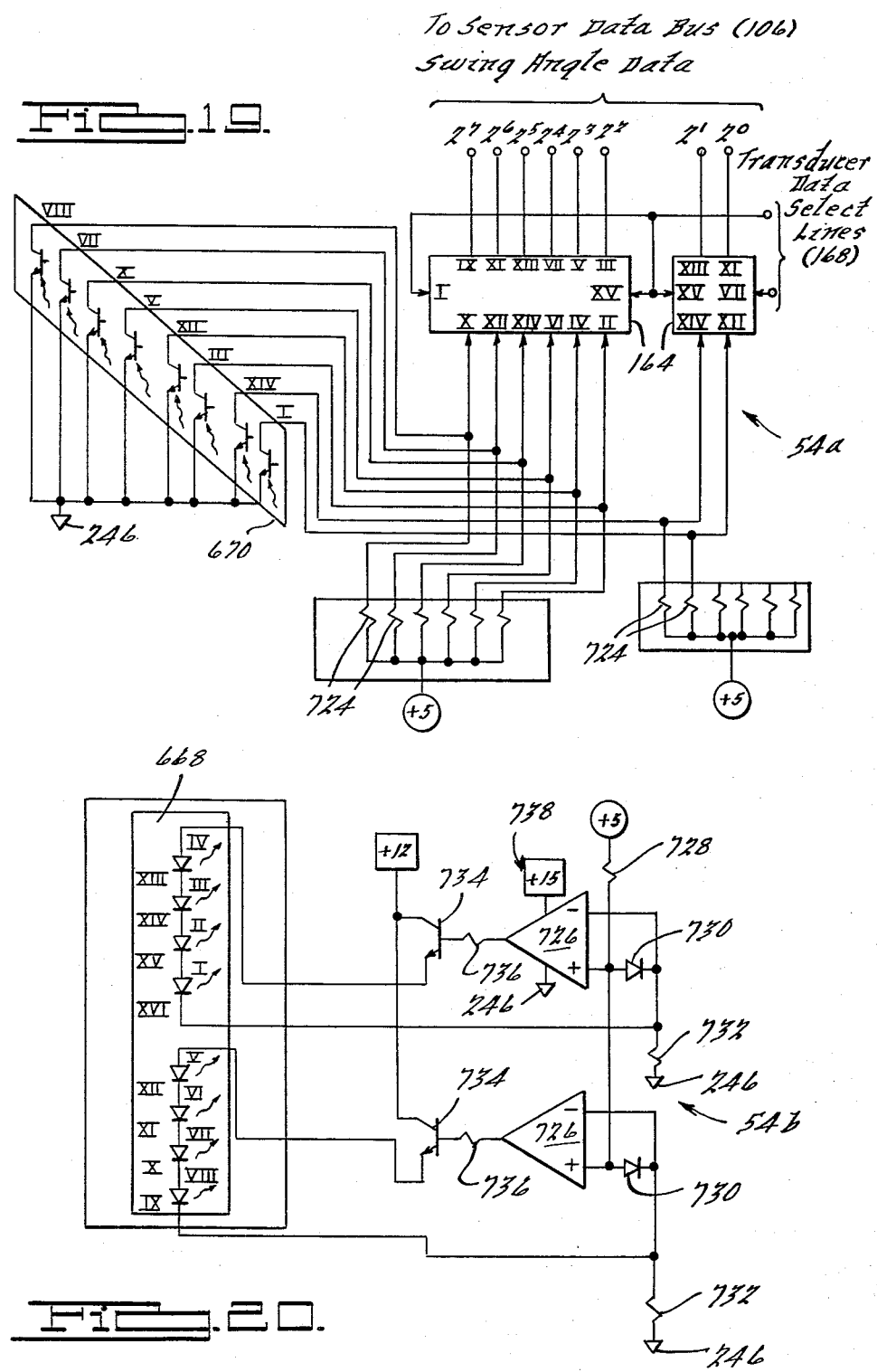

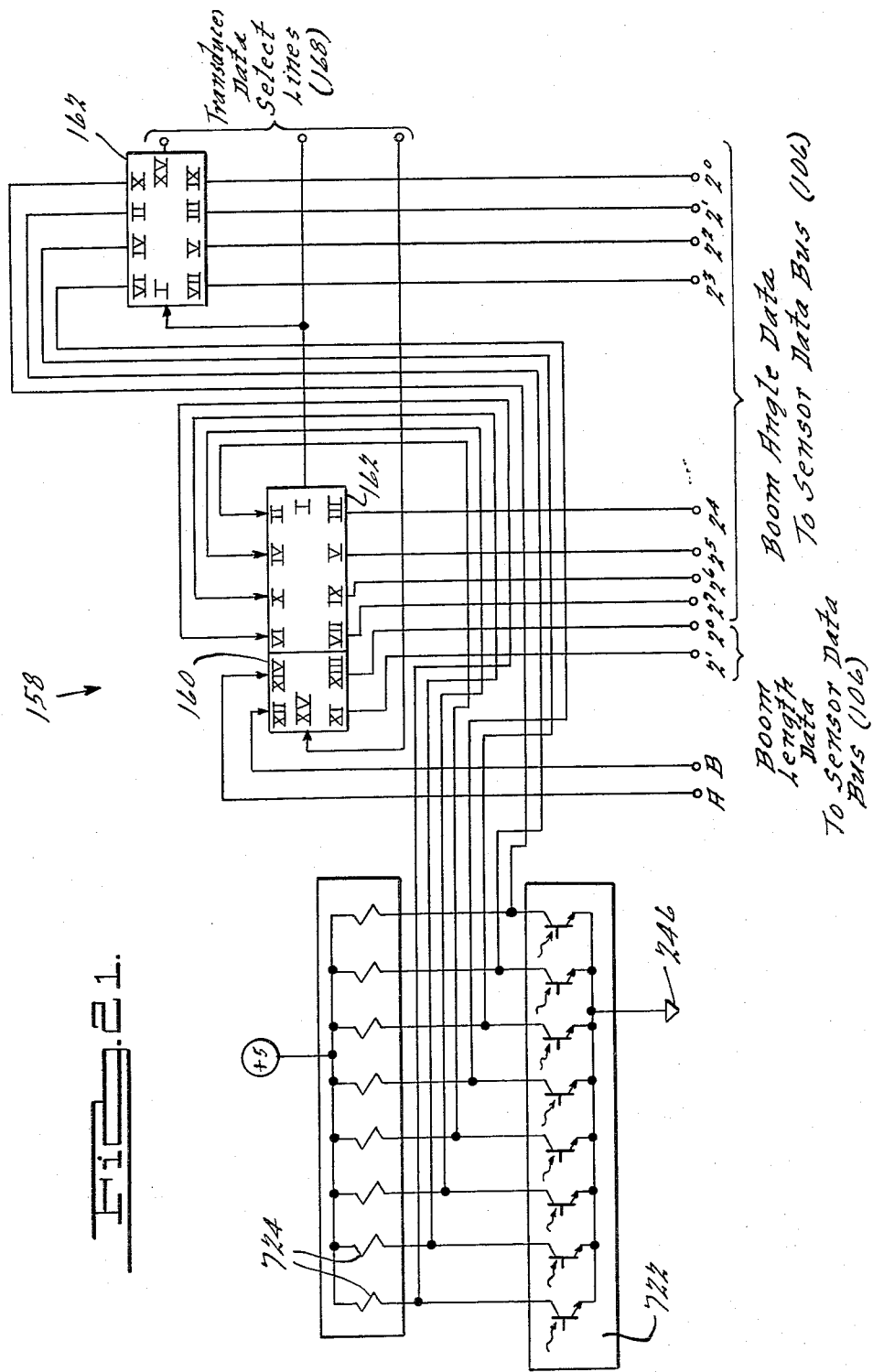

OPTICAL DIGITAL SENSOR FOR CRANE OPERATING AID

INTRODUCTION

This invention relates to an apparatus for aiding in the operation of a crane and specifically to the application of various crane parameter monitoring sensors and transducers in such operating aids.

CROSS-REFERENCE

The subject matter of this application is related to that of U.S. application Ser. No. 917,450, filed June 21, 1978, now U.S. Pat. No. 4,178,591.

BACKGROUND OF THE INVENTION

Devices for calculating and displaying the load supported by cranes, derricks, and the like, have long been used as operator aids in preventing unstable conditions or the overstressing of structural elements in the crane boom. This capability is particularly important in mobile cranes of the type having telescopingly extendable booms which can be slewed through the whole or part of a circle during normal operation. By comparing the load indication of an operating aid with the load rating tables supplied by the crane manufacturer for a specific crane and operating configuration, an operator can determine the relative stability of the crane. Typically, two methods of determining the load supported by a crane have been employed.

The first method involves the direct measurement of the actual weight of the load by devices such as tensiometers, strain gauges, and the like.

The second method involves the calculation of the total effective hook load, which is determined by first measuring geometrical parameters of the crane boom such as length and angle and then calculating the total turning moment of the boom and load about the boom pivot pin. By dividing the total turning moment by the horizontal radius of the load from the pivot pin, the total effective load can be calculated.

With both methods, the actual load or total effective load can thus be determined and displayed to the operator who, upon referral to the load rating tables, can determine the amount of crane lifting capacity remaining at any given time.

The measurement of crane geometrical parameters such as slewing angle, luffing angle, and boom length are often accomplished with potentiometers which produce a variable resistance as a function of the parameter being monitored. Typical of these arrangements is the device described in the invention to Greb, et. al., U.S. Pat. No. 3,489,294 which discloses a load limit control for hoisting equipment including a cable payout scheme driving a potentiometer to measure boom length.

Such systems while generally satisfactory have certain shortcomings and disadvantages. First, they are inherently analog devices which are relatively difficult to interface with a digital load moment computer, requiring A/D conversion. Additionally, because variable resistors are contacting type devices, they are subject to mechanical wear and long term instability. When used in a sensor employing a pendulum configuration such as one which measures boom angle, friction from the contacting type device results in inaccuracies as well as dither wear. Additionally, prior art analog systems may not detect an electrical failure such as a partial short or an open circuit which could result in giving the crane operator a dangerously misleading load indication.

BRIEF DESCRIPTION OF THE INVENTION

The present invention provides a crane operating aid having excellent long term stability and high accuracy through the entire range of operation. According to the invention, the operating aid employs a sensor having a detector associated with one of the crane portions and an encoder associated with another of the crane portions and operative to optically impart digitally encoded information to the detector representative of the displacement between the two crane portions.

In the preferred embodiment of the invention, sensors are provided to monitor the angular displacement between the crane upper and lower (slewing angle), the angular displacement between horizontal and boom mechanism (luffing angle), and the linear displacement between the tip section and base section of the telescopingly extendable boom mechanism (boom length).

The detector portion of the sensors employed in the preferred embodiment of the invention comprises an array of light emitting elements spaced from an array of light receiving elements. The encoder includes a surface defining a plurality of substantially parallel tracks which are intermediately in register with the light emitting and light receiving elements. The encoder is operative for lateral movement with respect to the detector to present the tracks of alternating transparent and opaque regions to the detector to optically impart digitally encoded information thereto representative of the displacement between the appropriate crane portions.

According to another aspect of the invention, the encoder comprises a substantially planar disc mounted for rotation about the axis thereof. The tracks are disposed coaxially with the axis upon a surface of the disc.

According to another aspect of the invention, a fault detection circuit is provided to generate a fault condition signal upon the electrical failure of one of the light emitting elements such as an open circuit condition.

According to another aspect of the invention, the encoder disc is constructed of substantially transparent material such as mylar having the opaque regions of the tracks photoprinted thereon.

According to another aspect of the invention, the light emitting elements comprise light emitting diodes and the light receiving elements comprise phototransistors.

According to another aspect of the invention, groups of light emitting elements are electrically connected in series whereby upon the failure of one of the elements, all of the elements will cease to emit light. In such a case, operator interface means is provided to receive the fault condition signal and to generate an operator sensible system default signal as a function thereof.

According to still another aspect of the invention, means are provided operative to remove selected crane operating functions from operator control upon receiving the fault condition signal.

Various other features and advantages of this invention will become apparent upon reading the following Specification which, along with the patent drawings, describes and discloses a preferred illustrative embodiment of the invention in great detail.

The invention makes reference to the accompanying drawings.

BRIEF DESCRIPTION OF THE DRAWINGS

FIG. 1 is a side elevational view of a typical mobile crane within which the present invention is employed;

FIG. 2 illustrates the operating aid of the present invention in block diagram form, implemented in a telescoping crane, the crane boom being illustrated with an optional jib;

FIG. 3 is a partial block diagram of the operating aid of FIG. 2;

FIG. 4 is another partial block diagram of the operating aid of FIG. 2;

FIG. 5 is a partial block diagram, which along with the partial block diagrams of FIGS. 3 and 4 constitute the operating aid of FIG. 2;

FIG. 6 is a plan view of the left half of the operator console of FIG. 2;

FIG. 8 is a schematic diagram of the lampstrips and latch decoder/driver embodied in the present invention;

FIG. 9 is a schematic diagram of the set point control and keyboard decoder circuit embodied in the present invention;

FIG. 10 is a schematic diagram of the clock generator embodied in the present invention;

FIG. 11 is a schematic diagram of the power up/reset circuit embodied in the present invention;

FIG. 12 is a schematic diagram of the optional two-block jib offset sensor embodied in the present invention;

FIG. 13 is a schematic diagram of the analog conditioning circuit for the pressure transducers embodied in the present invention;

FIG. 14 is a schematic diagram, typical of the three pressure transducers and span/zero circuits combined in the present invention;

FIG. 15 is a cross sectional view of the swing angle sensor of the operating aid of FIG. 2;

FIG. 16 is a broken top view, typical of the three optical digital sensor discs and LED-phototransistor arrays in the present invention;

FIG. 19 is a schematic diagram of a portion of the swing angle sensor circuit embodied in the present invention;

FIG. 20 is a schematic diagram of another portion of the swing angle sensor circuit embodied in the present invention; and FIG. 21 is a schematic diagram of the boom angle sensor circuit embodied in the present invention.

DETAILED DESCRIPTION OF THE SPECIFIC EMBODIMENT

Figure 7:
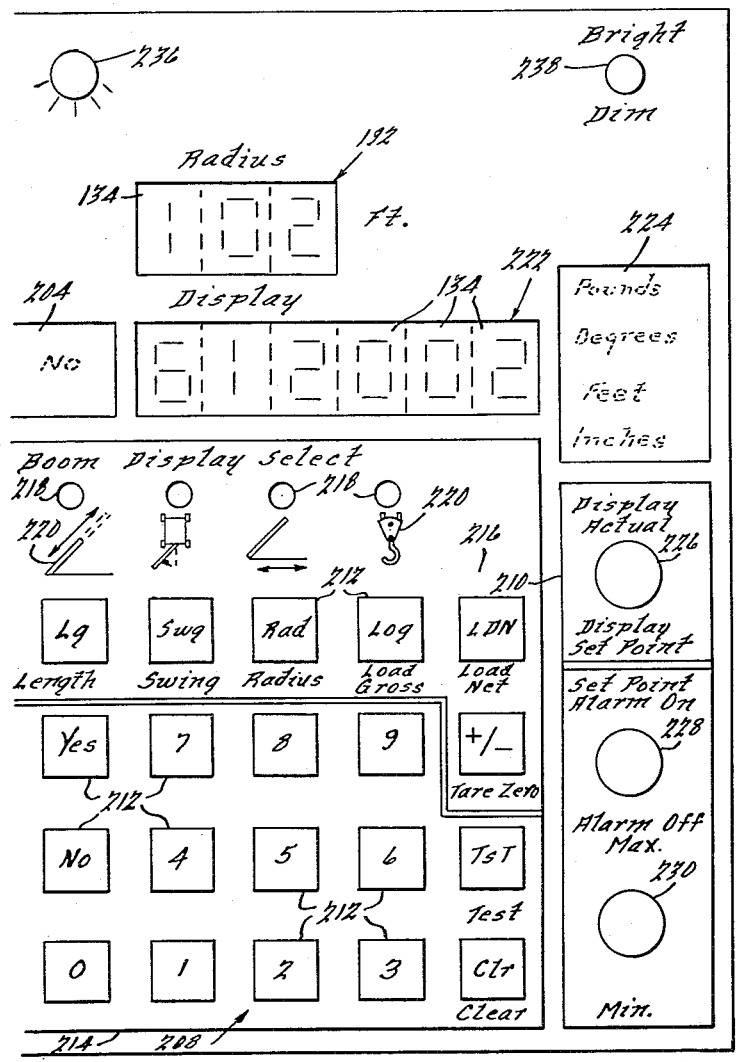
FIG. 7 is a plan view of the right half of the console of FIG. 2.

FIG. 1 illustrates a typical mobile crane 10 within which the present invention is employed. Crane 10 comprises a rotating part or upper 12 which is pivotably attached to a carrier or lower 14 through an intermediate slewing ring and gear 16. Lower 14 comprises wheels 18 as well as their related suspension, steering, and drive mechanism (not illustrated) which are controlled by the operator positioned in a cab 20. Cab 20 is illustrated as being an integral part of upper 12. In this type of configuration, an operator can operate the crane boom mechanism 22 associated with crane 10 as well as drive the vehicle from place to place. Other types of cranes are available having two cabs, one integral with the upper for use solely in controlling the crane boom mechanism, and one in the lower for driving the crane. Single cab cranes typically are designated as rough terrain mobile cranes while cranes employing two cabs are designated as carrier mount type cranes.

Upper 12 of the illustrated mobile crane 10 can be slewed or pivotably rotated a full 360° about an axis defined by slewing ring and gear 16. Lower 14 also includes outriggers (not illustrated) which are used to stabilize lower 14 when crane 10 is stationary by relieving the loading forces on tires 18. The utilization of outriggers is well known in the art and will not be elaborated upon here. Crane 10 thus has three support conditions; the first being when lower 14 is on outriggers, the most stable condition; the second being "on tires" where lower 14 is stationary but the outriggers are retracted; and third, the least stable condition being "pick and carry" wherein the outriggers are retracted and crane 10 is being driven while supporting a load.

Crane boom mechanism 22 comprises a hydraulic telescopingly extendable boom comprising a base section 24, midsection 26, and tip section 28. Although only one midsection is illustrated, it is contemplated that more than one could be employed. Boom mechanism 22 is typically double acting, requiring hydraulic pressure for retraction as well as deployment. The lowermost end of base section 24 is pivotably attached to a support member 30 which is integral with upper 12. One or more lift rams 32 support boom mechanism 22 through a range of luffing angles (the angle of inclination defined by the center line of boom 22 and horizontal). The rod end of each lift ram 32 is pivotably attached to base section 24 of boom mechanism 22 while the cylinder end of each lift ram 32 is pivotably attached to upper 12. An operator controlled hydraulic circuit (not shown) is provided whereby the operator, by deploying or retracting lift rams 32, can luff boom mechanism 22 to any desired angle. In the preferred embodiment of the invention two lift rams 32 are employed which laterally staddle base section 24 of boom mechanism 22.

A drum (not illustrated) selectively deploys a hoist rope 34 which passes over a support pulley 36 supported on the uppermost end of midsection 26 and continues to pass over a sheave pulley 38 pivotably affixed to the uppermost end of tip section 28 of boom mechanism 22. Hoist rope 34 then supportively passes through a floating bottom sheave block 40 and is fixedly connected with tip section 28. Hoist rope 34 could alternatively be fixedly connected to sheave block 40. Floating bottom sheave block 40 includes a load supporting hook 42. The operator, by controlling the hoist rope drum, can raise and lower loads affixed to hook 42.

Referring to FIG. 2, a block diagram of a crane operating aid 44 embodying the present invention is illustrated. Operating aid 44 includes a console 46 located within cab 20 to provide intercommunication between aid 44 and the operator. Although console 46 is illustrated as being within cab 20 it is contemplated that it could be located anywhere adjacent a designated operator position. A power supply 48 energizes console 46 as well as various sensors which are electrically interconnected with console 46. Power supply 48 is electrically interconnected with B+ or the ignition system of crane 10. Power supply 48 also has an output which is electrically interconnected with an auxilliary relay (not illustrated) which is employed as an operator override to shut down certain hydraulic functions such as a "boom down" or "boom extend" should a certain predetermined set of conditions such as overload exist at any time. A combined boom angle/boom length/pressure conditioner box or transducer drum 50 is mounted to the base section 24 of boom mechanism 22 and is electrically connected with console 46 whereby power is transmitted from console 46 to box 50 and crane parametric information from the various transducers and sensors are transmitted from box 50 to console 46. A level sensor 52 and a swing sensor 54 are physically affixed to upper 12 and are electrically connected to box 50. Level sensor 52 provides a signal to operating aid 44 as a function of the relative horizontal disposition of crane 10. Swing sensor 54 provides slewing angle information, i.e., is the boom "over front", "over side", or "over rear", to operating aid 44. Three pressure transducers 56 are in fluid communication with the hydraulic fluid in lift rams 32 and transmit a signal to box 50 as a function of the pressure in lift rams 32. A boom angle transducer as well as a boom length transducer is disposed within box 50. The boom length transducer operates by paying out a cable 58 which is fixedly attached to the uppermost end of tip section 28 of boom mechanism 22 through supporting cable clips 60 affixed to the uppermost end of midsection(s) 26 of boom mechanism 22. The boom length transducer within box 50 measures the amount of cable 58 deployed as sections 26 and 28 of boom mechanism 22 are deployed and generates a signal proportional thereto.

FIG. 2 also illustrates an optional fly jib 62 pivotably attached to the uppermost end of tip section 28. Fly jib 62 is angularly offset from the center line of boom mechanism 22. This offset angle is determined by the amount of luff cable 64 deployed from a luff cable drum (not illustrated). Luff cable 64 passes over a cable support member 66 which is upstanding from and supported by the uppermost portion of tip section 28 of boom mechanism 22. Thus, the offset angle of fly jib 62 is controlled by the operator by deploying or retracting luff cable 64. Hoist rope 34 passes over a support pulley 68 pivotably attached to cable support member 66 and a sheave pulley 70 at the uppermost end of fly jib 62. Hoist rope 34 terminates in a weighted load supporting hook 72. A luff angle sensor 74 is affixed to fly jib 62 and has a mechanical position sensing link 76 interconnecting luff angle sensor 74 and tip section 28. An anti two-block switch 78 is affixed to the upper end of tip section 28. Both luff angle sensor 74 and anti two-block switch 78 are electrically interconnected with box 50 by cable 58. Anti two-block switch 78 operates as a position switch, sensing the proximity of load supporting hooks 42 and 72 to sheave pulleys 38 and 70 respectively. It is contemplated that either digital or analog sensors can be employed in operating aid 44. In the preferred embodiment however, the boom angle and boom length transducers as well as swing transducers 54 are digital devices while luff angle sensor 74 and pressure transducers 56 are analog devices. Box 50 also contains a circuit which provides analog conditioning of the pressure transducers signals. Thus, all of the sensor inputs of the crane are collected in the main transducer drum or box 50 for transmission to console 46.

One of the primary functions of aid 44 is to determine the effective load being supported by the load supporting hooks 42 or 72. As is well known in the art, this is accomplished by summing the load moments about boom pivot point 80 and dividing by the horizontal radius or distance between pivot point 80 and the load being supported by hooks 42 or 72. The aid 44, by calculating the effective weight support by the hook 42 or 72, can compare that figure with the maximum load permitted at that particular crane configuration and virtually instantaneously apprise the operator of the status of the crane.

In the embodiment of crane boom mechanism 22 illustrated in FIG. 2, two parallel lift rams 32 are employed which straddle base section 24. The rod side of rams 32 are commonly interconnected with transducer $56u$ while the cylinder sides of lift rams 32 each have their own transducers $56r$ (right) and $56l$ (left). The output signals of transducers $56l$ and $56r$ are averaged and the difference between the average and the output of transducer $56u$, adjusted for the difference in pressure area, is transmitted to console 46.

Fly jib 62 is illustrated as having the capability of being luffed by the operator. However, it is contemplated that luff cable 64 could alternatively be affixed to tip section 28 rather than to the jib luff cable drum in which situation the offset angle between the fly jib 62 and the boom mechanism 22 would be altered only by lowering boom mechanism 22 and manually resetting fly jib 62. Additionally, in some alternative embodiments, tip section 28 of boom mechanism 22 is manually operated rather than hydraulically whereby it must be deployed while boom mechanism 22 is in substantially horizontal position.

Referring to FIGS. 3, 4, and 5, a block diagram of crane operating aid 44 is collectively illustrated. FIG. 5 illustrates the computer and memory portion of operating aid 44. FIG. 3 generally illustrates the transducers and sensors along with their interface with the rest of the circuit while FIG. 4 generally illustrates the operator oriented input/output (I/O) portion along with their interfacing circuitry of crane operating aid 44.

The computing portion of crane operating aid 44 comprises a type MOS TECHNOLOGY 6502 microprocessor 82 which is interconnected with a type IM 6561 read/write random access memory (RAM) 88 as well as a type Ser. No. 745472N programmable read only memory (PROM) by an I/O data bus 94 and an address bus 96. A signal amplifying type Ser. No. 7417 buffer 98 is connected in-line with address bus 96 between microprocessor 82 and RAM and PROM memories 88 and 90 respectively. PROM memory 90 is divided into two physically distinct and separated portions 90A and 90B. PROM memory portion 90A is reserved for program data which is commonly applied to all cranes of the type within which operating aid 44 is implemented while PROM memory portion 90B is custom and reserved for data which is uniquely characteristic or required by the specific model crane in which operating aid 44 is implemented. Because the RAM and PROM memories 88 and 90 respectively, consist of a relatively large number of individual chips or modules all of which are connected to address bus 96, a type Ser. No. 74L154 address decoder 92 is provided to receive an input from address bus 96, demultiplex the coded address signal and generate an enable signal for the identified RAM or PROM memory element 88 or 90 respectively. Enable lines 100 interconnect address decoder 92 and each of the RAM and PROM memory elements 88 and 90 respectively. An I/O control bus 102 electrically interconnects microprocessor 82 and RAM memory 88. A 500 KHz square wave timing signal is provided microprocessor 82 and I/O control bus 102 by a clock generator 84 which, in turn, receives timing signals from microprocessor 82. A power up/reset circuit 86 electrically feeds microprocessor 82 and control bus 102 for initialization of the microprocessor 82. Power up/reset circuit 86 also provides protection against transient low voltage pulses, causing reinitialization of the processor in such a case.

Referring to FIG. 4 control, data, and address buses 102, 94, and 96 respectively, are electrically connected to one or more peripheral interface adapters (PIA) or circuits 104 of the type manufactured by Motorola, type 6820. PIA 104 receives sensor data via a sensor data bus 106 which passes through an intermediate high frequency and hash filter 108. Output sensor select lines 110 interconnect PIA 104 and a type CD 4515 three to eight line decoder 112. Key test code lines 114 run from PIA 104 to a four to sixteen line decoder 119 and key test lines 121 run from decoder 119 to a keyboard decoder circuit 116 and a set point control circuit 118. Key and toggle sense lines 120 in turn pass from keyboard decoder circuit 116 and a set point control circuit 118 to PIA 104. The key test code transmitted over lines 114 interrogates each key in keyboard decoder circuit 116 and switch in set point control circuit 118 periodically to determine which, if any, has been actuated. A switch select circuit 122 includes a dual-in-line programmable (DIP) switch which serves two functions. During normal operation, the setting of the DIP switch in switch select circuit 122 determines what percent loading capacity will fire the auxilliary relay. Alternatively, switch select circuit 122 can be set to a predetermined diagnostic code for the display of raw input data or other critical signals within the crane software. A diagnostic display of light emitting diodes (LEDS) is provided within console 46 for this function. However, the display is for diagnostics only and is not normally within view of the crane operator.

An output data bus 124 interconnects PIA 104 with a bank 126 of type CD 4042 data latches, nine type 4511 seven segment readout decoder/drivers 128 and a lampstrips and latch decoder/driver circuit 130. PIA 104 and lampstrip and latch decoder/driver circuit 130 are also interconnected by two strip select lines 132. Each of the nine seven segment readout decoder/drivers 128 have an associated type 3015F BM15 seven segment display 134 interconnected with its associated driver 128 by segment driver lines 136. Data strobe lines 138 and 140 carry a strobe code for selecting specified output devices from PIA 104 to data latch bank 126 and seven segment readout decoder/driver 128 respectively through intermediate type CD 4515 four to sixteen line decoders 142 and 144 respectively. Output select lines 146 interconnect data latch bank 126 and lampstrips and latch decoder/driver 130, diagnostic lights 148 located within console 46 and various legend lamps displays, relays, and buzzers 150, through an intermediate type ULN 2003 current amplifying buffers 152. The lampstrips and latch decoder/driver 130, legend lamps displays, relays, and buzzers 150, seven segment displays 134, set point control 118 and keyboard decoder circuit 116 are all physically mounted on console 146 within the cab 20 or otherwise near a designated operator position. Legend lamps, displays, relays, and buzzers 150, diagnostic LED 148 and lampstrips and latch decoder/driver 130 are all commonly connected to output data bus 124 through buffers 152 and latch bank 126.

A two rate oscillator 154 electrically drives the buffer 152 associated with the buzzer in the legend lamp, display, relay, and buzzer circuit 150. Oscillator 154 causes buzzer 150 to be pulsed two times per second whenever an operator establish set point is exceeded and four times per second whenever the load supported by the crane is off of the manufacturer's published load rating tables or when the load is between 85% and 100% of the rated load capacity designated on the tables. When the load exceeds a 100% of rated capacity, the buzzer sounds continuously.

Referring to FIG. 3, a boom length sensor 156 and a boom angle sensor 158 as well as swing sensor 54 and level sensor 52 are connected to sensor data bus 106 through type MM 80C97 tri-state latches 160, 162, 164, and 166 respectively. Boom length sensor 156, swing sensor 54 and boom angle sensor 158 are eight bit absolute encoding digital optical sensors which are described in great detail in the forthcoming discussion relating to FIGS. 15 through 21 inclusive. Level sensor 52 comprises four mercury switches arranged in a quadrant configuration on the outriggers of crane 10. Transducer data select lines 168 interconnect the output of three to eight decoder 112 and each tri-state latch 160, 162, 164, and 166.

Pressure transducers 56u, 56l, and 56r each have a span/zero circuit 170, 172, and 174 respectively which interconnect pressure transducers 56 with an analog conditioning and pressure to force scaling circuit 176. The output of analog conditioning circuit 176 is an analog signal proportional to the average force differential across lift rams 32. This signal is fed into an analog to digital (A/D) converter 178 which, in turn, is fed to sensor data bus 106 through another tri-state latch 180. Transducer data select lines 168 interconnect three to eight line decoder 112 and tri-state latch 180 as well as three to eight, line decoder 112 to A/D converter 178. One data select line 168 which is connected to A/D converter 178 serves to carry an A/D synchronizing trigger pulse.

An optional two-block/jib offset sensor is provided comprising the parallel combination of luff angle offset sensor 74 and anti two-block switch 78, the output of which is fed into an analog conditioning circuit 182 which amplifiers and scales the output of two-block-switch 78 and jib offset sensor 74. If during operation, a two-block warning signal is generated at the output of analog conditioning circuit 182, that signal is fed directly to an operator warning device (not illustrated). Additionally, the output of analog conditioning circuit 182 is fed to a tri-state latch 184 through an A/D converter 186. One of the transducer data select lines 168 from three to eight line decoder 112 is fed into tri-state latch 184. All transducers and sensors therefore are commonly fed to sensor data bus 106 through tri-state latches 180, 184, 160, 164, 162, and 166. Crane operator aid 44 therefore can receive data from any one of the transducers or sensors by generating an appropriate sensor select code on output select lines 110. Tri-state latch 180 is of the type MM 80C97 manufactured by National. A/D converters 170 and 178 are of the type 8700 CN manufactured by Teledyne. The specific integrated circuits enumerated herein are intended to be for illustration purposes only and it is contemplated that numerous other discreet and integrated devices could be substituted by one skilled in the art. Additionally, the actual software routines which would be employed with the system disclosed herein would be evident to one skilled in the art in light of this specification and a set of design parameters or a specific crane and desired operating features.

Referring to FIGS. 6 and 7, crane operating aid 44 interfaces with the crane operator through control console 46. All of the switches, lamps, legends, displays, and the like necessary for intercommunication between the operator and operating aid 44 are located on console 46 to facilitate operating ease. Additionally, with the exception of transducers 56u, 56l, and 56r, sensors 74, 78, 156, 54, 158, and 52, span/zero circuits 170, 172, and 174, and analog conditioning circuits 176 and 182, all the logic and switching circuits of operating aid 44 illustrated in FIGS. 3, 4, and 5 are housed within console 46. All control and indicating devices located on console 46 are segregated into distinct function blocks some of which are subject to and others of which are independent of direct operator control. One function block that is independent of operator control is the percentage of rated load indicator 188 which comprises a vertical string of 15 incandescent lights or lamps 190 which are sequentially labelled from 10% to 110% of rated load. Only one of lights 190 is "on" at a given time thereby giving the operator an indication of the percent of rated load being supported by the crane at that particular instant. As the percentage load supported by the crane increases or decreases, the light 190 which indicates the proper percent of load at the present configuration will be on. The percent of load indicator 188 is subdivided into three parts 188A, 188B, and 188C. Part 188A is colored green and contains the lights 190 ranging from 10% to 80% of rated load, part 188B is colored yellow and contains lights 190 with the range from 85% to 95% of rated load, and part 188C is colored red and contains the range of 100% to 110% of rated load. By merely glancing at percentage of load indicator 188, the operator can quickly and accurately determine the percentage of the actual load being supported by the crane to that load specified by the crane manufacturer as being maximum permissible for that particular given crane configuration. The capability of reading percent capacity is provided to give the operator an accurate reading of the crane status even in the overload condition.

The other function block provided which is independent of operator control is a radius readout 192, comprising three seven segment displays 134 which continuously indicate to the operator the horizontal distance from boom pivot point 80 to the load suspended on hoist rope 34.

A prompting function block 194 is provided on console 46 containing indicia representing a series of prompting status requests 196 along with a catalog of acceptable operator responses 198. For example, the first of the series of status requests pertains to the crane support condition. The three possible support conditions being; (1) on outriggers; (2) on tires or; (3) pick and carry, the operator must respond to that particular request by providing console 46 with the code number representative to the support condition of the crane at that particular time. Adjacent each prompting status request indicia 196 is an indicator such as an incandescent bulb 200. Operating aid 44 indicates to the operator which input information it desires by serially energizing each of the indicator lamps 200 while receiving the operator responses thereto. Questions not pertinent to a given crane are automatically skipped.

Prompting function block 194 cycles through the series of prompting status requests in response to an operator initiative such as start-up of the crane or operator intervention during normal operation. The latter normally occurs when a change of crane status has taken place such as the addition of a fly jib. It is contemplated, however, that "operator initiative" also includes activation of means which will periodically automatically recycle through the series of prompting status requests.

The entire surface of console 46 is a single sheet of photo etched translucent mylar or the like. The legends and indicia associated with percent of load indicator 188 and prompting function block 194 are first surface photo etched on the mylar, i.e., are printing on the surface closest the operator and are thus, always visible to him.

Two crane status indicator blocks 202 and 204 are provided on console 46 with second surface indicia which is only visible in the presence of back lighting. Incandescent bulbs (not shown) are provided behind each second surface indicia in blocks 202 and 204 to selectively display information to the operator which is currently significant or pertinent while not distracting him with the display of irrelevant indications. For example, the indicia in block 202 representative of the operator's most recent response to a given status request would be displayed as a confirmation device. When the support condition status request is made and the crane was "on outriggers" at the time of the last status request and operator response, this fact would be demonstrated to the operator. Additionally, information such as "off load chart", "exceeding cable strength", and "level" are illuminated when appropriate to apprise the operator of those particular conditions. The level indication is transmitted to the operator by means of "level" and "unlevel" indicia as well as four lamps 206 arranged within block 202 in a quadrant equivalent to the crane to indicate which outrigger(s) is high or low with respect to the others. Crane status indicator block 204 contains second surface indicia "yes" and "no" which have back lighting and are selectively made visible to the operator when appropriate during the posing of the prompting status requests.

Two operator input blocks 208 and 210 are provided in console 46 to receive operator responses to the prompting status requests as well as operator initiated input. Operator input block 208 comprises an input portion 214 and a mode display select portion 216. Data input portion 214 comprises input keys 212 for digits zero through nine inclusive as well as "yes" and "no" response keys. Additionally, input data portion 214 also comprises "test", "clear", "program", "skip", and "enter" function keys. Mode display select portion 216 provides for operator selected display of boom angle, length, swing, radius, gross load, net load, and tare zero. Tare zero is defined as the different between gross load and net load. Mode display select portion 216 also has a set of mode lamps 218 and internationally recognizable characters 220 associated with each lamp to identify the function the specific lamp 218 is designating.

A general purpose readout 222 comprising six seven segment displays 134 is provided on console 46. Readout 222 can be used to display any of the six functions included in mode display select portion 216 as well as a confirmation display of the operator response to prompting requests. A unit display block 224 is provided immediately adjacent the right handmost seven segment display 134 of general purpose readout 222 and includes indicia representing the units appropriate to the digital readout of display 222. The indicia of unit display block 224 are second surface photo etched on the mylar sheet with illuminating lamps therebehind so that only the appropriate indicia is visible at any given time. Although illustrated in English units, other systems such as metric could be substituted.

Operator input block 210 provides a set point function and comprises three manually operated toggle switches 226. 228, and 230. A manually entered set point is displayed on general purpose readout 222 when switch 226 has been shifted from its normal "display actual" position to the "display set point" position. A minimum or a maximum set point will be displayed depending upon the setting of toggle switch 230. Toggle switch 228 arms an audible alarm such as a buzzer 232 which, in the block diagram of FIG. 4 would be found in legend/lamp/display/relay/buzzer block 150. A visual alarm such as an attention attracting light can also be added. A set point is established merely by turning toggle switch 226 to "display set point", keying in the numerical set point desired on the data input portion 214 of input block 208 and hitting enter switch 212.

An on-off/reset switch 234 is provided as a manually redundant reset feature for the power up/reset circuit 86 of FIG. 5. A console illuminating bulb 236 and a bright/dim console illuminating function switch 238 are provided to accommodate varying ambient lighting conditions.

Referring to FIG. 8, a schematic diagram of light strings 190 and 200 along with a strip select circuit 240 are illustrated. The lines of output data bus 124 are connected to input terminals II, III, XXI, and XXII of a type 4514 CP latch 126. Strobe data line 138 is connected to the base of a type 2N5172 transistor 242 through a 33K Ohm current limiting resistor 244. To eliminate repetition, unless stated differently, all resistance values are in Ohms and capacitive values are microfarads. The emitter of transistor 242 is connected to a common tie point 246. The collector of transistor 242 is connected to terminal I of latch 126. Terminal I of latch 126 is also connected to a +5 VDC highly regulated voltage supply through a 4.7 K current limiting resistor 248. Strobe line 138 is pulsed approximately three times per second causing the current code on data bus 124 to be latched and ultimately used to select a light 190 or 200 to be illuminated. Output terminals XVI, XIII, XIV, XIX, XX, XVII, and XVIII of latch 126 are connected to input terminals VII, VI, V, IV, III, II, and I of type ULN 2003A buffer 152 respectively. Likewise, input terminals I, II, III, IV, V, VI, VII of a second buffer 152 are electrically connected to output terminals IV, V, VI, VII, VIII, X, and IX respectively of latch 126. Terminals VIII of both buffers 152 are electrically connected to tie point 246 while terminals IX of both buffers 152 are electrically connected to a relatively unregulated lamp voltage supply (V$_L$). Output terminals XII and XXIII of latch 126 are connected to tie point 246. Terminal XXIV of latch 126 is connected to the +5 VDC power supply and to tie point 246 through a 0.01 filter capacitor 250.

Output terminals X, XI, XII, XIII, XIV, XV, XVI of both buffers 152 are each electrically connected to a light 190 and/or a light 200 through a diode 252. The other side of lights 190 are commonly connected to the collector of a type 2N4402 transistor 254 in strip select circuit 240. The other side of lights 200 are commonly connected to the collector of a second type 2N4402 transistor 256 in strip select circuit 240. As a design convenience, a single discreet buffer is in the form of a series 4.7 K resistor 258 and a two transistor (types 2N5172 and 2N3414) Darlington arrangement 260.

The emitters of transistors 254 and 256 are commonly connected to the lamp voltage supply through a 6.8 current surge limiting resistor 262. The base of transistor 254 is connected to lamp voltage supply through a series combination of a 1 K resistor 264 and a 33 K resistor 266. The base of transistor 256 is likewise connected to lamp voltage supply through a series combination of a 1 K resistor 268 and a 33 K resistor 270. The tie point between resistors 264 and 266 is electrically connected to the collector of a type 2N5172 transistor 272 and the tie point between resistors 268 and 270 is electrically connected to the collector of another type 2N5172 transistor 274. The emitters of transistors 272 and 274 are electrically connected to tie point 246. The two strip select lines 132 are connected to the bases of transistors 272 and 274 through a 4.7 K resistors 276 and 278 respectively.

In normal operation one of the strip select lines 132 is high and the other one is low. The only instance when that is not the case is when a set point is being established so as to prevent the operator from drawing any erroneous conclusions from percent of load or prompting status request indications. Light strings 190 and 200 are arranged so that only one can be at at a given time. Again, this is to prevent the operator from developing any false sense of security and to direct his attention to the appropriate operation of the operating aid 44. If, for example, the strip select lines 132 associated with transistor 272 goes low, transistor 274 will conduct whereby transistor 254 will be turned off and transistor 256 will conduct. Accordingly, only indicators 200 are connected to the lamp voltage supply and the one whose code is present on output data bus 124 will light.

Referring to FIG. 9 the schematic diagram of the set point control circuit 118 and the keyboard/decoder circuit 116 is illustrated. Key test code lines 114 from PIA 104 are connected to four to sixteen line decoder 119 input terminals II, III, XXI, XXII. Terminals XXIII and XII of decoder 119 are connected to tie point 246 while terminals XXIV and I are electrically connected directly to the +5 VDC power supply and to the tie point 246 through a 1.0 filter capacitor 280. One side of each toggle switch 226, 228 and 230 are connected to the +5 VDC power supply through separate diodes 282, 284, and 286 respectively and a common current limiting 33 K resistor 288. The other side of toggle switches 226, 228, and 230 are connected to output terminals XIV, XIII, and XVI respectively of four to sixteen line decoder 119. One key, toggle sense line 120 is connected to the +5 VDC power supply through resistor 288. The other key, toggle sense line 120 is connected to the +5 VDC power supply through a second 33 K current limiting resistor 290. For reference, the end of resistor 290 not connected to the +5 VDC power supply is designated as tie point A and the end of resistor 288 which is not associated with the +5 VDC power supply is designated as tie point B.

Output terminals XV of decoder 119 is connected to tie point A through a series combination of "skip" switch 212 and a diode 292 and to tie point B through "enter" switch 212 and another diode 292. Output terminal XIX of decoder 119 is connected to tie point A through a series combination of "test" switch 212 and a diode 292. Output terminal XX of decoder 119 is connected to tie point A through a series combination of "no" switch 212 and a diode 292 and to tie point B through a series combination of "yes" switch 212 and a diode 292. Output terminal XVII of decoder 119 is connected to tie point A through a series combination of "clear" switch 212 and a diode 292 and to tie point B through a series combination of "nine" switch 212 and a diode 292. Output terminal XVIII of decoder 119 is connected to tie point B through a series combination of "eight" switch 212 and a diode 292. Output terminal IV of decoder 119 is connected to tie point A through a series combination of "program" switch 212 and a diode 292 and to tie point B through a series combination of "seven" switch 212 and a diode 292. Output terminal V of decoder 119 is connected to tie point A through a series combination of "+/−" switch 212 and a diode 292 and to tie point B through "six" switch 212 and a diode 292. Output terminal VI of decoder 119 is connected to tie point A through a series combination of "angle" switch 212 and a diode 292 and to tie point B through a series combination of "five" switch 212 and a diode 292. Output terminal VII of decoder 119 is connected to tie point A through a series combination of "length" switch 212 and a diode 292 and to tie point B through a series combination of "four" switch 212 and a diode 292. Output terminal VIII of decoder 119 is connected to tie point A through a series combination of "swing" switch 212 and a diode 292 and to tie point B through a series combination of "three" switch 212 and a diode 292. Output terminal X of decoder 119 is connected to tie point A through a series combination of "radius" switch 212 and a diode 292 and to tie point B through a series combination of "two" switch 212 and a diode 292. Output terminal IX of decoder 119 is connected to tie point A through a series combination of "load gross" switch 212 and a diode 292 and to tie point B through a series combination of "one" switch 212 and a diode 292. Output terminal XI of decoder 119 is connected to tie point A through a series combination of "load net" switch 212 and a diode 292 and to tie point B through a series combination of "zero" switch 212 and a diode 292.

The keyboard circuit operates by receiving a test code on lines 114 which sequentially interrogates each switch 212 by grounding one side. Because sense lines 120 are connected to tie points A and B below resistors 250 and 288, crane operator aid 44 can determine if a switch 212 has been actuated by the operator when one of sense lines 120 goes low. The key test code on lines 114 at the precise instance one of sense lines 120 goes low identifies the specific key 112 which has been actuated. Normally, all keys 112 are effectively open circuited and sense lines 120 will both be high. Toggle switches 226, 228, and 230 are interrogated in the same way as are push buttons 212.

Referring to FIG. 10, the schematic diagram of clock generator 84 is illustrated. Clock generator 84 interfaces with output terminal XXXIX and input terminal XXXVII of microprocessor 82. Output terminal XXXIX is connected to tie point 246 by a 22 picofarad filter timing capacitor 294 and to input terminal XXVIII is connected to tie point 246 through a forward biased diode 298 and to the +5 VDC power supply through a reverse biased diode 300. Terminal XXXIX is tapped into I/O control bus 102 through a series combination of two type SN7404 inverters 302 and 304. The point of common connection between inverters 302 and 304 is connected to the cathode side of diode 300 through a series combination of a 2.94 K resistor 306 and a 100 K potentiometer 308. The wiper and one end of potentiometer 308 are commonly tied to the inverters 302 and 304. Part of the oscillator circuit is actually in microprocessor 82 itself, the clock generator 84 comprising a feedback circuit for the oscillator. Potentiometer 308 and resistor 306 determine the oscillator frequency while diodes 298 and 300 are provided for clipping to improve output wave form shape.

Referring to FIG. 11, the schematic diagram of power up/reset circuit 86 is illustrated. When on-off/reset switch 234 is thrown +5 VDC is supplied at all of the points indicated. A 10 capacitor 310 receives this voltage step and begins charging, causing a decaying voltage spike. Capacitator 310 is connected to the base of a type 2N5172 transistor 312 through a series combination of a 100 Ohm resistor 314 and a 33 K current limiting resistor 316. The base of transistor 312 is connected to tie point 246 through a 0.01 filter capacitor 318 and to tie point 246 through a 33 K drain path resistor 320. The emitter of transistor 312 is connected directly to tie point 246 and the collector is connected to the +5 VDC power supply through a 4.7 K current limiting resistor 322. The point of common connection between resistors 314 and 316 is connected to the +5 VDC power supply through a series combination of a 1 K resistor 324 and a Schottky diode 326. The anode of diode 326 is connected to tie point 246 through a 120 Ohm resistor 328. The collector of transistor 312 is connected to reset input terminal XL of microprocessor 82 through a series combination of two type 7404 inverters 330 and 332. Terminal XL of microprocessor 82 is connected to tie point 246 through a 200 picofarad bypass capacitor 334 and to the collector of transistor 312 through a series 33 K feedback resistor 336. Input terminal XL of microprocessor 82 is also connected to the +5 VDC power supply through a current limiting 1 K resistor 338.

In operation, when the +5 VDC power supply is turned on, capacitor 310 begins to charge causing the base of transistor 312 to see a voltage spike which decays over a relatively short period of time. This causes transistor 312 to momentarily conduct wherein the voltage at the collector varies to produce a reset pulse which is twice inverted in inverters 330 and 332 having hysteresis, resulting in a crisp pulse to low, which resets the microprocessor 82 by initializing the CPU therein. Resistor 324 and Schottky diode 326 biases the base of transistor 312 whereby a "glitch" or temporary drop in supply voltage will cause the CPU to be reinitialized.

Referring to FIG. 12, the schematic diagram for the luff angle offset sensor 74, anti two-block switch 78 and analog conditioning circuit 182 is illustrated. Anti two-block switch 78 is mounted on the tip section 28 of boom mechanism 22 or the outwardmost end of fly jib 62 to sense the proximity of hook 42 or 72 to sheeve pulley 38 or 70 respectively. At a predetermined distance from sheeve pulley 38 or 70, hook 42 or 72 opens anti two-block switch 78 to provide a warning signal to the operator or alternatively shutting down the machine. Connected electrically in series with anti two-block switch 78 is luff angle offset sensor 74 comprising a potentiometer having its wiper connected commonly with the side of the fixed resistor opposite switch 78. The wires from switch 78 and sensor 74 are combined in cable 58 running into combined boom angle/boom length/pressure/conditioner box (transducer housing)

50. Within housing 50 two slip rings 340 and 342 are provided to facilitate deployment of electrical cable to switch 78 and sensor 74 along with cable 58. Slip ring 342 is electrically connected to the negative input of a type LM224 operational amplifier (op amp) 344. The negative input of op amp 344 is also connected to tie point 246 through a 2.94 K reference resistor 346. The negative input of op amp 344 is also connected to tie point 246 through a series 1.0 capacitor 348. The positive input of op amp 344 is connected to tie point 246 through a 2.94 K resistor 350 and to a +5 VDC power supply through a 22.1 K resistor 352. The output of op amp 344 is connected to slip ring 340. The gain of op amp 344 is determined by the feedback resistance or the setting of the potentiometer comprising luff angle offset sensor 74. Resistors 350 and 352 are included to set up a reference voltage. The output of op amp 344 is connected to the base of a type 2N3414 transistor 354 through a series combination of a 820 Ohm current limiting resistor 356 in a reverse biased zenor diode 358. The emitter of transistor 354 is connected directly to tie point 246. The collector of transistor 354 is connected to a two-block warning signal (not illustrated) such as a buzzer or the like or alternatively to an auxilliary relay which shuts down the crane in the event anti two-block switch 78 is opened. In such a case, the feedback path of op amp 344 is opened causing its output to go high, turning on diode 358 and ultimately causing transistor 354 to conduct, triggering the two-block warning signal.

The output of op amp 344 is also connected to A/D converter 100 through a series combination of a 50 K potentiometer 360 and a 143 K resistor 362. The wiper of potentiometer 360 is connected to the side associated with the output of op amp 344. The input of A/D converter 186 is connected to tie point 246 through a series combination of a 220 Ohm resistor 364 and a 680 picofarad capacitor 366. The resistor 364 and capacitor 366 operate as a filter. Potentiometer 360 serves as a jib luff angle span adjustment into A/D converter 186.

Referring to FIG. 13, the schematic diagram of analog conditioning circuit 176 is illustrated. Analog conditioning circuit 176 has an input from each pressure transducer 56 employed in determining the turning moment about boom pivot point 80. In the preferred embodiment of the invention three such transducers 56 were employed, however, it is contemplated that fewer or more could be used depending upon the specific application. The output signals of the three pressure transducers 56l, 56u, and 56r are fed to the inputs of the analog conditioning circuit 176. Each input is fed into a non-inverting buffer stage comprising a type LN224 op amp 368, the output of which is fed directly back to the negative input, a series 4.75 K input resistor 370, a 0.1 capacitor 372 interconnecting the positive input of op amp 368 and tie point 246 and a 3.32 K resistor 374 interconnecting the inputs and tie point 246. Each input from transducers 56l, 56u, and 56r is also directly connected to tie point 246 through a 680 picofarad filter capacitor 376. The output of the buffers associated with the left and right pressure transducers 56l and 56r respectively, are averaged by means of a voltage divider comprising two 22.1 K resistors 378 and 380 interconnecting the outputs of op amp 368. The tap of the voltage divider comprising resistors 378 and 380 is connected with the positive input of another buffer type LN224 op amp 382. The output of op amp 382 is connected to its negative input and also to the positive input of a subtractor type LM224 op amp 384 through a 22.1 K current limiting resistor 386. The positive input of op amp 384 is connected to tie point 246 through a 22.1 K reference resistor 388.

The output of the non-inverting buffer associated with upper transducer 56u is connected to one side of a compensating resistor 390 the other side of which is interconnected to tie point 246 with a 7.68 K resistor 392. Resistors 390 and 392 compensate for the difference in area between the rod end and body end of lift rams 32. Resistor 390 has a value which is equal to 7.68 K $(1-x)/x$ where x equals the ratio of the rod end area over the barrel end area. The compensated signal is then fed into a positive input of another buffer type LM224 op amp 394 through a 475 K resistor 396. The output of op amp 394 is interconnected with its negative input. An offset trim adjustment feature is provided by a 10 K potentiometer 398 connected at one end to tie point 246 and at the other end to the +5 VDC power supply through a 22.1 K current limiting resistor 400. The wiper of potentiometer 398 is connected to the positive input of op amp 394 through a 475 K resistor 402. The output of op amp 394 is connected to the negative input of subtracting op amp 384 through a 22.1 K resistor 404. The output of op amp 384 is connected with the negative input by a parallel combination of a 22.1 K resistor 406 and a 0.1 capacitor 408. Op amp 384 thus receives a signal in its positive input proportional to the average of the outputs of the left and right pressure transducers 56l and 56r respectively, and the negative input of op amp 384 receives a compensated signal proportional to the output of upper pressure transducer 56u. The output of op amp 384 is the difference between its inputs which represents the net force applied by boom mechanism 22 along the line of axis of lift rams 32. The output of op amp 384 is connected to the positive input of another type LM224 op amp 410. The negative input of op amp 410 is connected to tie point 246 through a 2.94 K resistor 412. The output of op amp 410 is connected to its negative input through a potentiometer 414. The wiper of potentiometer 414 is connected to the negative output of op amp 410. Potentiometer 414 provides a final force span adjustment which is used in calibrating operating aid 44 to a specific crane. The output of op amp 410 is connected to input terminal XIV of A/D converter 178 through a 475 K resistor 416. Terminal XV and XIV are interconnected by a 680 picofarad capacitor 418. Terminal XIV of A/D converter 178 is connected to tie point 246 through a series combination of 220 Ohm resistor 420 and a 680 picofarad capacitor 422. Resistor 420 and capacitor 422 form an input filter for A/D converter 178.

For the purposes of this specification terminal designations which appear as Roman Numerals are intended to be applicable only to the specific type of integrated circuit specified as being included in the preferred embodiment of the invention. However, it is contemplated that many other equivalent devices are available and could be substituted for those specified herein by one skilled in the art.

Referring to FIG. 14 a schematic diagram of a pressure transducer 56 and a span/zero circuit 170 typical of the three employed in the preferred embodiment invention is illustrated. Pressure transducer 56u is a variable voltage device having three terminals P, S, and C. Terminal P is for power input into transducer 56u, terminal C is a ground or common connection with the rest of the system and terminal S is the signal or output of transducer 56u. Terminal C is connected directly to common tie point 246. Terminal S is connected to input of analog conditioning circuit 176 through a span calibration resistor 424. The actual value of resistors 424 and 426 are selected to result in an output voltage of 2.40 volts at zero pounds per square inch (psi) pressure in lift ram 32 and 7.40 volts at 3,000 psi. Terminal P of transducer 56u is connected to tie point 246 through a 1.0 capacitor 428. Tie point 246 is connected to the +5 VDC power supply through a series combination of a 680 picofarad capacitor 430 and a 10 Ohm resistor 432. Capacitors 428 and 430 and resistor 432 comprise a power supply RC filter to block radio frequency interference (RFI).

Any number of power supplies well known in the art could be employed to complete the operating aid 44. For example, in the preferred embodiment a 12 or 24 VDC battery and ignition system within crane 10 feeds a switching power supply through a transient protection circuit. The output of switching power supply is a regulated 8 VDC which is used to power the lamps in console 46. The regulated 8 VDC also passes through a series pass regulator having a +5 VDC highly regulated output. The +5 VDC output of the series pass regulator is pass through a DC/DC converter to produce a highly regulated +15 VDC output. Implementation of such a power supply is not elaborated upon inasmuch as the hardware and technology is well known in the art.

Referring to FIG. 15, a cross-sectional view of swing sensor 54 as incorporated within crane 10 is illustrated. Swing sensor 54 is mounted to a base plate 500 which in turn is mounted to the floor pan of upper 12 (not illustrated). A drive pinion 502 is supported for rotation by pinion gear assembly housing 504 through upper and lower ball bearings 506 and 508, respectively. Drive pinion 502 is prevented from axial displacement by a retaining ring 510 inserted into an area of reduced diameter of pinion 502 approximate the uppermost end thereof. A seal 515 is provided adjacent the lowermost surface of bearing 508. Pinion 502 includes a pinion extension portion 502a projecting downwardly therefrom. The lowermost portion of pinion gear assembly housing 504 nests within an aperture 514 within base plate 500 being fixedly attached thereto such as by welding. Extension 502a projects downwardly below base plate 500 terminating in a coupling 512. An extension shaft 516, coaxial with extension 502a, depends downwardly from coupling 512 terminating in a flanged coupling 518. A driver gear 220 is mounted for rotation with shaft 516 by screws 522 threadably engaging the flanged portion of coupling 518. Set screws 524 pass through threaded apertures in couplings 512 and 518 to engage flats 526 in extension 502a and shaft 516 respectively. Driver gear 520 is thereby locked for rotation with drive pinion 502. The peripheral teeth of driver gear 520 engage inwardly projecting teeth 16a of slewing ring and gear 16. Extension shaft 516 is provided to accommodate the adoption of sensor 54 to varying crane configurations merely by changing the length of shaft 516. Although the preferred embodiment illustrates a slewing gear 16 having radially inwardly facing teeth 16a, it is contemplated that sensor 54 illustrated in FIG. 15 could be easily adapted for use with a slewing ring and gear having radially outwardly projecting teeth.

A cover 528, in combination with base plate 500, substantially encloses the mechanism of sensor 54. Cover 528 has an outwardly turned flange 530 which is secured to base plate 500 through an intermediate gasket 532 by screws (not illustrated).

The teeth of drive pinion 502 engage a driven gear 534 which is mounted for rotation with an optical code disc arbor 536 by screws 538. Arbor 536 and driven gear 534 are secured for rotation about a coaxially disposed bolt 544 and bearing 542. A washer 550 is disposed intermediate the uppermost surface of arbor 536 and a mounting arm 548 affixed to base plate 500 through pinion gear assembly housing 504. Bearing 542 passes through an aperture 546 in mounting arm 548 to abut a washer 552 disposed intermediate the head of bolt 544 and the uppermost surface of mounting arm 548. The lowermost end of bolt 544 threadably engages a T-nut 554 through an intermediate washwer 556. T-nut 554 is disposed within T-slot bracket 558 which, in turn, is fixedly mounted on base plate 500 such as by welding. During normal operation, bolt 544 is tightly engaged with T-nut 554 whereby bolt 544, washer 552, bearing 542, washer 556, and T-nut 554 are fixedly attached to base plate 500 via mounting arm 548 and T-slot bracket 558. In this position, arbor 536, driven gear 534, and an optical code disc 560 coaxially rotate about bearing 542. The optical code disc 560 is fixedly mounted to arbor 536 via screws 562. Washer 550 serves as a thrust bearing between the uppermost surface of arbor 536 and mounting arm 548. A washer 564 disposed between the lowermost surface of arbor 536 and the uppermost surface of washer 556 also serves as a thrust bearing. Driven gear 534 has the same number of teeth as crane slewing gear 16 and driver gear 520 has the same number of teeth as drive pinion 502. Therefore, there is a one-to-one correlation between the slewing of crane upper 12 with respect to lower 14 and the angular displacement of optical code disc 560. That is, in a complete 360 degree rotation of crane upper 12, optical code disc 560 will also rotate a full 360 degrees.

A caliper assembly 566 is mounted to pinion gear assembly housing 504 by screws (not shown) at a point radially outwardly from optical code disc 560. Caliper assembly 566 has an upper leg 566U and a lower leg 566L which depend radially inwardly toward bolt 544 straddling code disc 560. A radially oriented array of light emitting diodes (LEDs) 568 depends downwardly from upper leg 566U of caliper assembly 566. Likewise, a radially oriented array of phototransistors 570 depend upwardly from lower leg 566L of caliper assembly 566. LEDs 568 and phototransistors 570 are electrically connected with the rest of crane operating aid 44 through conducting cables (not illustrated). In operation, LEDs 568 and phototransistors 570 are spaced so that when the passageway therebetween is unobstructed by an opaque surface, light emitted from LEDs 568 is detected by phototransistors 570 causing them to conduct. When an opaque object passes between LEDs 568 and phototransistors 570, the light path is blocked causing phototransistors 570 to cease conducting.

Referring to FIG. 16, a top view of a broken portion of FIG. 15 is illustrated. Code disc 560 contains a number of coaxial radially spaced segments or tracks 572 which register with corresponding pairs of LEDs 568 and phototransistors 570 adjacent thereto. Each track comprises a series of alternating transparent and opaque regions 574 and 576, respectively. By selective spacing of the transparent and opaque regions 574 and 576, the array of phototransistors 570 can assume $2^n$ combinations of conducting or nonconducting states with n representing the number of tracks 572. In a digital system, the conducting or nonconducting phototransistors 570 are equated to high and low states of a binary code which is well known by one skilled in the art. Thus, in the case of swing sensor 54, the array of selectively conducting and nonconducting phototransistors 570 presents a binary code representative of the angular displacement of the crane upper 12 to the crane lower 14.

Referring to FIG. 15, mounting arm 548 is slidably affixed to pinion gear assembly housing 504 through interfitting complementary dovetail tongue and groove surfaces 578 and 580, respectively. With this arrangement, mounting arm 548 is displaceable only radially inwardly and outwardly with respect to pinion gear assembly housing 504. Such radial displacement is prevented when bolt 544 is tightened with T-nut 554. If swing sensor 54 is to be adapted for another machine having a slewing gear 16 having a lesser or greater number of teeth 16a than in the present example, it is necessary to change driven gear 534 to accommodate swing sensor 54 to the new system. If the new slewing gear has a different pitch, a new driven gear 520 must be fitted with identical pitch. Driven gear 520 always has the same number of teeth. This adaptation is accomplished by loosening bolt 544 on T-nut 554. Once so loosened, the entire assembly comprising mounting arm 548, bolt 554, washer 552, bearing 542, arbor 536, code disc 560, driven gear 534, washers 556 and 564, and T-nut 554 can be slidably displaced to the right. Leftward displacement is prevented by the abutment of driven gear 534 and driven pinion 502. Swing sensor 54 is modified by sliding the entire above described assembly to the right, replacing driven gear 534 with a new gear having the same number of teeth as the slewing gear in the machine of the new application, and sliding the assembly to the left until the new driven gear abuts drive pinion 502. Bolt 544 need merely again be tightened and the modification is complete.

Figure 17:
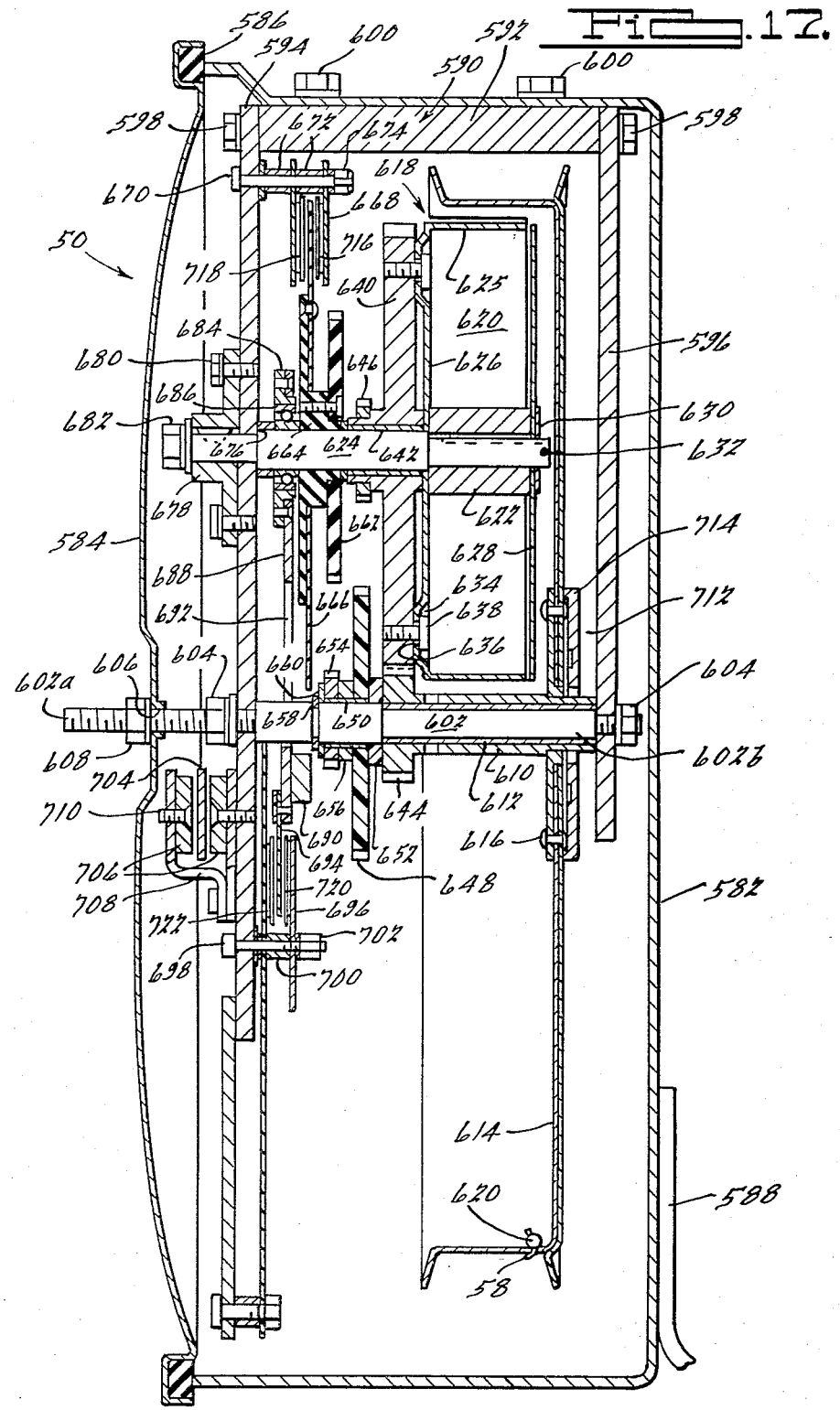
FIG. 17 is a side cross sectional view of the transducer box (50) of the operating aid of FIG. 2.

Referring to FIG. 17, a side cross-sectional view of transducer box 50 is illustrated. Transducer box 50 contains both boom angle sensor 158 and boom length sensor 156. Transducer box 50 comprises a one piece cylindrical housing 582 which is closed by a cover 584 and sealed by an annular neoprene gasket 586. Three mounting brackets 588 are mounted to the end surface of housing 582 and extend radially outwardly therefrom. Mounting brackets 588 define three arcuate circumferentially spaced mounting apertures (not illustrated) which are spaced radially outwardly of the circumferential wall of housing 582. Mounting bolts (not illustrated) pass through these apertures and into base section 24 of crane boom mechanism 22. The elongated arcuate slots provide a fine adjustment for boom angle sensor 158 by allowing a small degree of rotation of housing 582 about its nominal mounted position.

A main yoke 590 is disposed within housing 582 and comprises a base portion 592 and long and short legs 594 and 596, respectively, depending therefrom. Legs 594 and 596 are affixed to base portion 592 by bolts 598. Base portion 592 is affixed to the circumferential edge of housing 582 by bolts 600. A main reel shaft 602 is axially disposed within housing 582 and interconnects long and short legs 594 and 596, respectively, of yoke 590 by nuts 604 which threadably engage threaded ends of reduced diameter of main reel shaft 602. The forwardly facing threaded reduced diameter portion 602a of shaft 602 projects outwardly through an aperture 606 in cover 584 securing it to housing 582 by means of a nut 608 threadably engaging the extension portion 602a. The portion of main reel shaft 602 intermediate the inside surfaces of legs 594 and 596 is of increased diameter (identified as 602b) which abuts those surfaces and holds them in a fixed spaced relationship. A large reel 614 is disposed within housing 582 coaxial with shaft 602 and is mounted for rotation thereupon through a flanged hub 610 and an intermediate bushing 612. Reel 614 is affixed to hub 610 by rivets 616 or the like. Reel 614 is made of a relatively large diameter to minimize errors introduced in cable pileup which tends to vary the effective diameter of the drum during payout and retraction of cable 58 (not illustrated) thereon. As illustrated in FIG. 2, cable 58 tangentially pays off reel 614 as midsection 26 and tip section 28 of crane boom mechanism 22 are telescopically deployed outwardly. When these sections are retracted, cable 58 is retracted back on reel 614. The end of cable 58 is secured to reel 614 by passing through an aperture therein and being molded into a lead ball 620 or the like.

Cable 58 is retracted by means of a spring mechanism 618 comprising a spiral power spring (not shown for sake of clarity) disposed in the area generally designated 620, the radially inward end of which is secured to an arbor 622 which is, in turn, keyed to a power spring shaft 624 which is mounted to leg 594 of yoke 590. The radially outwardmost end of the spring disposed in space 620 is affixed to the circumferential edge of a cylindrical spring housing 625. Housing 625 is closed on its lefthandmost end by an integral wall member 626 and on the righthand end by a separate spring retaining plate 628 which is rotatably mounted on shaft 624 by means of a washer 630 and cotter pin 632. Wall member 626 comprises a number of circumferentially spaced outwardly projecting depressions 634 having apertures 636 centrally disposed therein. Screws 638 pass through apertures 636 into a spring gear 640 which is disposed for rotation upon shaft 624 through an intermediate bushing 642. The teeth of spring gear 640 engage the teeth of a reel gear 644 which is mounted for rotation with hub 610 about shaft 602. Depressions 634 provide clearance for the heads of screws 638. Thus, when crane boom mechanism 22 is in the fully retracted position, spring mechanism 618 is only in a slight preload condition. When mid and tip sections 26 and 28, respectively, are deployed, cable 58 is paid out tangentially from reel 614 through an aperture and cleaning apparatus (not illustrated) in housing 582. This winds up spring mechanism 618. As boom mechanism 22 is retracted, spring mechanism 618 unwinds drawing cable 58 back on reel 614. Thus, the angular displacement of the gears within housing 582 is a measure of the length of boom mechanism 22 at any given time.

A small toothed belt sprocket 646 is mounted for rotation with spring gear 640 which in turn drives a larger sprocket 648 which is mounted for rotation on shaft 602 through an intermediate bushing 650. The driving medium between sprockets 646 and 648 is a toothed belt which is not illustrated for sake of clarity. Sprocket 648 is spaced from reel gear 644 by a washer 652 and is mounted for rotation with a second small toothed sprocket 654 through an intermediate spacer 656. A lock washer 658 is disposed in an area of reduced diameter of shaft 602 which abuts sprocket 654 through an intermediate washer 660. Sprocket 654, in turn, drives a second large sprocket 662 disposed coaxially with a hub 664 for rotation on shaft 624. A second toothed belt (not illustrated) interconnects sprockets 654 and 662. Hub 664 supports an optical code disc 666 which is constructed in like fashion as disc 560 disclosed in the discussion of FIG. 15. The ratio of teeth on spring gear 640 to reel gear 644 is 4:1. The effective tooth ratio of sprocket 662, which turns in unison with code disc 666, to reel gear 644 is 40:1. A caliper assembly 668 comprising arrays of LEDs 716 and phototransistors 718 on its legs which straddle optical code disc 666 is mounted to leg 594 with appropriate screw 670, spacers 672, and nut 674. The operation of code disc 666 and caliper assembly 668 is substantially as described in the discussion of FIG. 15. In the present case, boom length sensor 156 presents a measure of the length of boom mechanism 22 in the form of a binary code. The electrical wiring within housing 582 is not illustrated for sake of clarity.

The lefthandmost end of shaft 624 has an area of reduced diameter which passes through an aperture 676 in long leg 594 of yoke 590. The area of reduced diameter of shaft 624 is keyed to a preload adjusting yoke 678 which in turn is secured to leg 594 by a number of circumferentially spaced bolts 680 which pass through a flange in yoke 678 to threadably engage leg 594. Shaft 624 is prevented from axial displacement by a nut 682 threadably engaging its lefthandmost end. To set the preload of boom length sensor 54, bolts 680 are removed and nut 682 is loosened. Yoke 678 is then rotatably repositioned with respect to leg 594, turning 624, arbor 622, and a radially innermost portion of the spring disposed in space 620. Once the desired preload is attained, bolts 680 are replaced and nut 682 is once again tightened.

Also mounted for rotation on shaft 624 is a boom angle segment hub 684 which turns freely thereabout on precision ball bearings 686. Projecting downwardly from hub 684 is a boom angle segment 688 which acts as a pendulum, freely pivoting about shaft 624. A weight 690 is affixed to boom angle segment 688 near the lowermost end thereof to overcome any frictional forces in bearing assembly 686. An arcuate slot 692 is provided in boom angle segment 688 through which passes shaft 602 which has no affect thereupon. Segment 688 is free to swing through a 90 degree arc corresponding with the range through which boom mechanism 33 can be luffed. Depending downwardly from segment 688 is an arcuate angle code segment 694 which is constructed as disclosed in the description of optical code discs 560 and 666 in the discussions of FIGS. 16 and 17. The only exception is that code segment 694 is adapted for only 90 degree rotational displacement while code discs 560 and 666 are displaced in full 360 degrees. A second caliper assembly 696 is provided having LED 720 and phototransistor 722 arrays disposed on legs which straddle code segment 694 as was described in the discussion of the boom length sensor 156. Caliper assembly 696 is mounted to long leg 594 through an appropriate bolt 698, spacer 700, and nut 702. Again, the electrical wiring is not illustrated for sake of clarity. The boom angle transducer operates by gravity in which the pendulum comprising segment 688, weight 690, and code segment 694 rotates on shaft 624 whenever boom mechanism 22 is luffed, to assume a new steady state position. The code on code segment 694 will result in a binary coded output representative of the angular displacement between yoke 590 and boom angle segment 688. This angle corresponds with the angle between the centerline of boom mechanism 22 and vertical.

An aluminum disc segment 704 is mounted to boom angle segment 688 (by means not illustrated) for pendulum-like movement therewith. Permanent ceramic magnets 706 are mounted to leg 594 through steel backup plates 708 laterally adjacent aluminum disc segment 704 to serve as an eddy current, frictionless damper for boom angle segment 688 as it pivots about shaft 624. Magnets 706 are secured to backup plate 708 by means of screws 710.

An annular space 712 defined by the outwardmost surface of a reel reinforcing plate 714, the insidemost surface of short leg 596 and the circumferential surface of hub 610 is reserved for optional slip rings 340 and 342 described in the discussion of FIG. 12.

Referring to FIGS. 18 through 21, the schematic diagrams of swing angle transducer 54, boom angle transducer 158, and boom length transducer 156 along with their respective tri-state latches 164, 162, and 160 and interconnecting circuitry are illustrated. Because there is a great deal of repetition in the circuitry, an illustrative detailed description of only one of the circuits will be given.

Regerring to FIG. 19, the schematic diagram of photo transistor array 670 and its interconnection with tri-state latch 164 and the light receiving portion 54A of swing angle sensor 54 is illustrated. The emitters of each phototransistor within array 670 is electrically connected to tie point 246. Each collector in phototransistor array 670 is electrically connected to an input of tri-state latch 164 and to the ±5 VDC power supply through 10K pull up resistors 724. The output terminals of tri-state latch 164 is connected to sensor data bus 106 as described in the discussion of FIG. 3. Transducer data select lines 168 are connected to strobe input terminals I, XV, and VII to inject the code generated by phototransistor array 670 onto sensor data bus 106 upon receiving the proper designated strobe code on line 168. Thus, depending upon the pattern of transparent or opaque portions 574 and 576 respectively interspaced between arrays 668 and 670, the circuit of FIG. 19 will operate to generate a binary code representative of the pattern and inject that code on to sensor data bus 106 upon command. This mode of operation is common with the phototransistor array circuit of both boom length transducer 156 and boom angle transducer 158.

Referring to FIG. 20 the LED array 668 and associated circuitry portion 54B of swing angle transducer 54 is illustrated. The positive input terminal of an op amp of the type LM324 manufactured by National Semi Conductor is connected to a +5 VDC power supply through a series 15K current limiting resistor 728. The positive input of op amp 726 is also connected to tie point 246 through a series combination of a forward biased diode 730 and a 220 Ohm resistor 732. The negative input of op amp 726 is also connected to tie point 246 through resistor 732. Op amp 726 is also directly connected to the +15 VDC power supply and tie point 246. The output of op amp 726 is interconnected to the base of a type 2N5172 transistor 734 through a 15K resistor 736. The collector of transistor 734 is connected to a +12 VDC power supply and the emitter of transistor 734 is connected to the negative input of op amp 726 through a series combination of four LEDs within array 668.

Op amp 726 and its associated discrete components comprise a fault detection circuit 738 which serves a two fold purpose. First, the circuit 738 serves to provide a constant current supply to the series string of LEDs in array 668. Constant current allows for substantially constant light output which is required for the sensor. The voltage drop across LEDs typically greatly changes over temperature. The second function of the circuit is to detect the failure of any of the LEDs within array 668 and to generate a fault condition signal upon sensing such a failure. Typically, LEDs will fail in the open condition wherein the continuity between the emitter of transistor 734 and the negative input of op amp 726 will be broken. A separate op amp 726 is provided for each string of four LEDs within arrays 668, 716, and 720. During normal operation, when all of the LEDs in array 668 are emitting light, the positive input of op amp 726 is at substantially +5 VDC inasmuch as the positive input impedence of op amp 726 is substantially greater than that of resistor 728. Inasmuch as the operation of an operational amplifier is well known in the art it will not be elaborated upon here. The output voltage of op amp 726 will seek a level effectively equalizing its inputs. This is accomplished by driving the base of transistor 734 so that enough current will flow from the +12 VDC power supply through transistor 734 and the string of LEDs in array 668, ultimately to tie point 246 through resistor 732. The output of op amp 726 will increase until enough current is drawn through the LEDs and resistor 732 to result in a 5 volt drop across resistor 732, matching that of the positive input. During temperature variations during normal operation, the voltage drop across the LEDs of array 668 will vary causing a voltage differential at the inputs of op amp 726 which responds by appropriately increasing or decreasing the supply voltage to the base of transistor 734 which in turns corrects the input imbalance of op amp 726.

Figure 18:
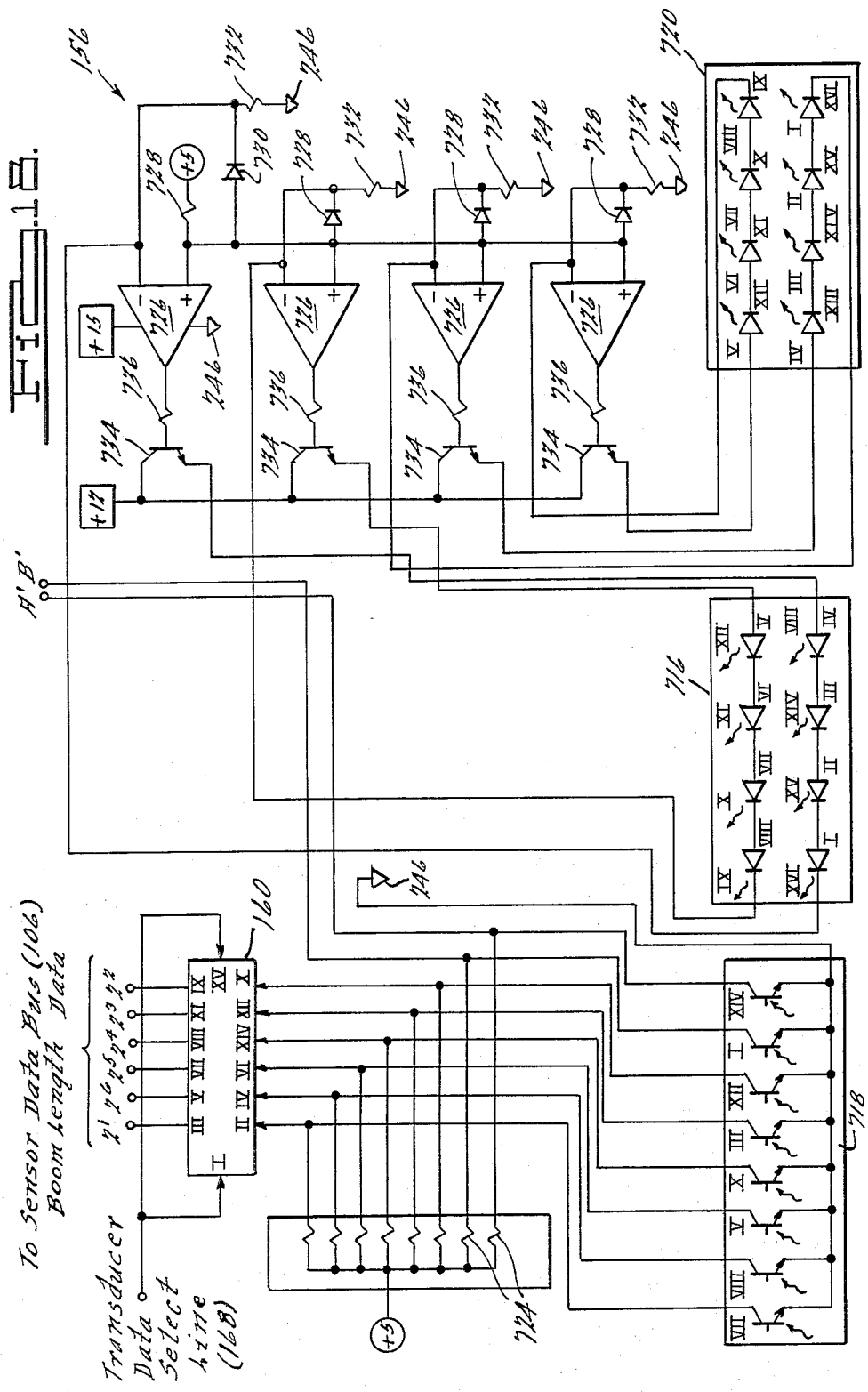
FIG. 18 is a schematic diagram of the boom length sensor circuit embodied in the present invention.

If an LED in array 668 fails in the open state, op amp 726 will saturate while attempting to correct the imbalance at its inputs. The +5 VDC power supply is then connected to tie point 246 through a series combination of resistor 728 diode 730 and resistor 732. Because resistor 728 is substantially larger than resistor 732 the voltage at the positive input of op amp 726 will be extremely low (substantially less than 1 volt). Because the LEDs are arranged in series the series associated with op amp 726 will all be off. Additionally, the positive inputs of all op amp 726 are directly electrically interconnected (including those in FIG. 18). This will pull all of the positive inputs of op amp 726 down to less than 1 volt effectively shutting off all of the LEDs in the various arrays 668, 716, and 720. The binary code which results in this condition is a fault condition signal which when impressed on sensor data bus 106 is ultimately received by the legend lamp display-relay-buzzer 150 within console 46 which in turn transmits a visual or audible signal to the operator that a failure has occurred. The relay can be employed to shut down selected functions of the crane should such a failure occur. Each of the fault detection circuits 738 operate as described in a description of operation of swing angle transducer 54. It should be pointed out that many aspects of the preferred embodiment are for engineering expedient reasons and it is contemplated that many variations therefrom would be obvious to one skilled in the art in light of the specification. For example, the LED array 668, 716, and 720 employed were of the type manufactured by HEI, Inc., model LA 208E. It is contemplated that other equivalent units could be substituted therefore. Finally, to complete the partial boom length sensor 156 as illustrated in FIGS. 18 and 21, terminals A' and A must be interconnected and terminals B' and B must be interconnected.

It is to be understood that the invention has been described with reference to specific embodiments which provide the features and advantages previously described, and that such specific embodiments are susceptible to modification, as will be apparent to those skilled in the art. Accordingly, the foregoing description is not to be construed in a limiting sense.

What is claimed is:

1. In a crane including a first portion and a second portion, said portions being operably moveable with respect to one another, an absolute encoding digital optical sensor comprising:
   detector means associated with one of said portions and including an array of light emitting elements;
   encoder means associated with the other of said portions and operative to optically impart digitally encoded information to said detector means representative of the displacement between said portions;
   means operative to energize a series connected plurality of said light emitting elements; and
   a fault detection circuit operative to maintain a constant current through said series connected plurality of light emitting elements and to generate a fault condition signal operative to deenergize all of the light emitting elements within said array upon detecting a failure of any one of said light emitting elements.

2. In a crane including a first portion and a second portion, said portions being operably moveable with respect to one another, a crane operating aid comprising:
   detector means associated with one of said portions and including an array of light emitting elements;
   encoder means associated with the other of said portions and operative to optically impart digitally encoded information to said detector means representative of the displacement between said portions;
   means operative to energize a series connected plurality of said light emitting elements;
   a fault detection circuit operative to maintain a constant current through said series connected plurality of light emitting elements and to generate a fault condition signal operative to deenergize all of the light emitting elements within said array upon detecting a failure of any one of said light emitting elements; and
   operator interface means operative to receive said digitally encoded information and generate a sensible crane condition signal as a function thereof.

3. In a crane including an upper mounted for rotation upon a lower and a boom pivotally mounted upon said upper, a crane operating aid comprising:
   a first absolute encoding digital optical sensor operative to monitor the slewing angle between said upper and lower and to generate a slewing angle data signal as a function thereof;
   a second absolute encoding digital optical sensor operative to monitor the luffing angle between said boom and upper and to generate a luffing angle data signal as a function thereof; and
   operative interface means operative to receive said signals and to generate sensible crane condition signals as a function thereof; each said sensor comprising detector means including an array of light emitting elements;

encoder means operative to optically impart digitally encoded information to said detector means representative of the displacement therebetween;

means operative to energize a series connected plurality of said light emitting elements; and a fault detection circuit operative to maintain a constant current through said series connected plurality of light emitting elements and deenergize all of the light emitting elements within all of said sensors upon detecting a failure of any one of said light emitting elements.

4. The sensor of claim 1, wherein said portions are angularly displaceable with respect to one another.

5. The sensor of claim 4, wherein said first portion comprises a crane upper and said second portion comprises a crane lower, wherein said sensor is operative to monitor the slewing angle of said crane.

6. The sensor of claim 4, wherein said first portion comprises a boom mechanism and said second portion comprises a crane upper.

7. The sensor of claim 1, wherein said portions are linearly displaceable with respect to one another.

8. The sensor of claim 7, wherein said first portion comprises a base section of a telescopingly extendable boom mechanism and said second portion comprises a tip section of said boom, wherein said sensor operates to monitor the length of said boom mechanism.

9. The sensor of claim 8, further comprising payout means displaceable with said encoder means and operative to deploy and retract cable intermediate distal points upon said base section and tip section as a measure of the linear displacement therebetween.

10. The sensor of claim 1, wherein said detector means comprises an array of light receiving elements spaced from said array of light emitting elements.

11. The sensor of claim 10, wherein said light emitting elements comprise a plurality of light emitting diodes and said light receiving elements comprise a plurality of phototransistors.

12. The sensor of claim 11, wherein each of said phototransistors is in register with a corresponding light emitting diode through an intermediate space and operative to receive light from said light emitting diode when said space is unobstructed by an opaque object.

13. The sensor of claim 12, wherein said encoder means includes a surface defining a plurality of substantially parallel tracks and operative for lateral movement intermediate said phototransistor and light emitting diodes, each said track comprising a plurality of alternating transparent and opaque regions.

14. The sensor of claim 13, wherein said encoder means comprises a substantially planar disc mounted for rotation about the axis thereof, said tracks disposed coaxially with said axis upon a surface of said disc.

15. The sensor of claim 14, wherein said disc comprises substantially transparant material such as mylar, the opaque regions of said tracks being photoprinted thereon.

16. The crane operating aid of claim 2, wherein said operator interface means is operative to receive said fault condition signal and to generate a sensible system fault signal as a function thereof.

17. The crane operating aid of claim 16, further comprising means operative to remove selected crane operating functions from operator control upon receiving said system fault condition signal.

18. The crane operating aid of claim 2, wherein said first portion comprises a crane upper and said second portion comprises a crane lower, wherein said sensor is operative to monitor the slewing angle of said crane.

19. The crane operating aid of claim 2, wherein said first portion comprises a boom mechanism and said second portion comprises a crane upper.

20. The crane operating aid of claim 2, wherein said first portion comprises a base section of a telescopingly extendable boom mechanism and said second portion comprises a tip section of said boom, wherein said sensor operates to monitor the length of said boom mechanism.

21. The crane operating aid of claim 3, wherein said boom comprises a plurality of telescopingly extendable sections.

22. The crane operating aid of claim 21, further comprising a third absolute encoding digital optical sensor operative to monitor the linear displacement between two of said sections and to generate a boom length data signal as a function thereof.

23. The crane operating aid of claim 22, further comprising a load moment computer operative to receive said luffing angle data signal and boom length data signal, and to generate an effective load signal as a function thereof.

24. The crane operating aid of claim 23, wherein said operator interface means is operative to receive said effective load signal and to generate a sensible load signal as a function thereof.

* * * * *